US011865846B2

(12) United States Patent
Suzuki et al.

(10) Patent No.: US 11,865,846 B2
(45) Date of Patent: Jan. 9, 2024

(54) INKJET PRINTER

(71) Applicant: Roland DG Corporation, Hamamatsu (JP)

(72) Inventors: Akihiro Suzuki, Hamamatsu (JP); Hirokazu Kakei, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 187 days.

(21) Appl. No.: 17/682,002

(22) Filed: Feb. 28, 2022

(65) Prior Publication Data

US 2022/0219457 A1 Jul. 14, 2022

Related U.S. Application Data

(63) Continuation of application No. PCT/JP2019/033686, filed on Aug. 28, 2019.

(51) Int. Cl.

*B41J 2/175* (2006.01)
*B41J 2/17* (2006.01)
*B41J 2/165* (2006.01)

(52) U.S. Cl.

CPC ......... *B41J 2/17566* (2013.01); *B41J 2/1652* (2013.01); *B41J 2/1721* (2013.01); *B41J 2002/1728* (2013.01); *B41J 2002/17573* (2013.01)

(58) Field of Classification Search

CPC ........ B41J 2002/17573; B41J 2002/185; B41J 2002/1856; B41J 2002/1735

See application file for complete search history.

(56) References Cited

U.S. PATENT DOCUMENTS 4,245,505 A * 1/1981 Baynes ............... A47J 37/0713 126/41 R
6,148,668 A * 11/2000 Sieg ........................ G01F 23/20 126/41 R
2006/0111807 A1 5/2006 Gothait et al.
2018/0272720 A1* 9/2018 Mashima ............. B41J 2/17566
2019/0193405 A1* 6/2019 Suzuki ................. B41J 2/16523
2019/0329564 A1* 10/2019 Lo ........................ B41J 2/17566
2020/0361211 A1* 11/2020 Suzuki ................... B41J 2/1721

FOREIGN PATENT DOCUMENTS

CN 201669976 U 12/2010
JP 2009-149029 A 7/2009
JP 2010-099856 A 5/2010
JP 2018-158546 A 10/2018
JP 2019-111804 A 7/2019
JP 2020-185695 A 11/2020

OTHER PUBLICATIONS

Official Communication issued in International Patent Application No. PCT/JP2019/033686, dated Oct. 8, 2019.

* cited by examiner

*Primary Examiner* — Shelby L Fidler
(74) *Attorney, Agent, or Firm* — Keating & Bennett, LLP

(57) ABSTRACT

An inkjet printer includes a support table supporting a waste liquid tank and being displaceable in accordance with a weight of the waste liquid tank, a first sensor to detect that the support table has reached a first position, a second sensor to detect that the support table has reached a second position, a first determinator to determine that the waste liquid tank is in a near-end state when the support table is detected by the first sensor to have reached the first position, and a notifier to notify a user of the near-end state when the first determinator determines that the waste liquid tank is in the near-end state.

12 Claims, 15 Drawing Sheets

INKJET PRINTER

CROSS REFERENCE TO RELATED APPLICATIONS

This application claims the benefit of priority to PCT Application No. PCT/JP2019/033686 filed on Aug. 28, 2019. The entire contents of which are hereby incorporated herein by reference.

BACKGROUND OF THE INVENTION

1. Field of the Invention

The present invention relates to an inkjet printer.

2. Description of the Related Art

Conventionally, a printer including an ink head that includes a plurality of nozzles to perform printing on a printing target by an inkjet method is known. For such a printer, a cleaning operation is periodically performed on the ink head in order to allow ink to be injected stably from the nozzles. For example, an ink flushing operation of forcibly injecting ink from the nozzles, an ink absorption operation of forcibly absorbing ink in the nozzles by an absorption pump, or the like is performed. Such a cleaning operation allows ink having an increased viscosity, contaminants and the like to be discharged from the nozzles. As a result, clogging of the nozzles may be solved or suppressed.

The ink, the contaminants and the like discharged by the cleaning operation are recovered to a waste liquid tank as a waste liquid. As the cleaning operation is repeated, the waste liquid is accumulated gradually in the waste liquid tank. When the waste liquid tank becomes full and is overflown with the waste liquid, the inside of, and an area around, the printer may undesirably be contaminated with the waste liquid. Therefore, conventionally, the printer is controlled to stop operating when the waste liquid tank becomes full. In the case where the operation of the printer is stopped, the printing operation, the cleaning operation and the like may be made inexecutable until the user discharges the waste liquid from the waste liquid tank. In this manner, the waste liquid tank is prevented from being overflown. An amount of the waste liquid in the waste liquid tank may be estimated by use of software based on data on the cleaning operation, or may be measured by use of hardware.

For example, Japanese Laid-Open Patent Publication No. 2018-158546 discloses a liquid injection device including a liquid injector injecting a liquid, a waste liquid accommodator accommodating a waste liquid discharged from the liquid injector, and a sensor detecting that the amount of the waste liquid accommodated in the waste liquid accommodator has reached a threshold value. This liquid injection device further includes a calculator. In the case where the sensor detects that the amount of the waste liquid accommodated in the waste liquid accommodator has reached the threshold value, the calculator calculates the amount of the waste liquid discharged from the liquid injector thereafter by use of software. The calculator adds the amount of the discharged waste liquid calculated by use of the software to the threshold value, and thus estimates the amount of the waste liquid in the waste liquid accommodator.

With such an example of calculation method performed by use of software, the number of times the cleaning operation is performed is counted, or the number of times the ink is injected from the ink head is counted, to compute the amount of the waste liquid. However, such a method uses a sequence addition, and therefore, the error of the computed amount of the waste liquid from the actual amount of the waste liquid may be large in the case where, for example, the cleaning operation includes a certain content. In the case where the amount of the waste liquid is computed in accordance with the type or the content of the cleaning operation, the computation may become complicated. In addition, in the case where the printing operation is made inexecutable unexpectedly for the reason that the waste liquid tank is full, the user may feel inconvenienced if, for example, the user is in a hurry to perform printing.

SUMMARY OF THE INVENTION

Preferred embodiments of the present invention provide inkjet printers each allowing a state where a waste liquid tank is full or is close to being full to be accurately recognized with no need to perform any complicated computation.

An inkjet printer according to a preferred embodiment of the present invention includes a head including a nozzle from which a liquid is injected, a cleaner to perform a cleaning operation of causing the liquid to be discharged from the nozzle, a waste liquid tank to which the liquid discharged by the cleaning operation is recovered from the cleaner, and a support table supporting the waste liquid tank. The support table is displaceable in accordance with a weight of the liquid in the waste liquid tank, such that the support table is at an initial position in a state where the liquid is not recovered to the waste liquid tank, is displaced to a first position when a weight of the waste liquid tank and the liquid in the waste liquid tank reaches a first threshold value, and is displaced to a second position when the weight of the waste liquid tank and the liquid in the waste liquid tank reaches a second threshold value larger than the first threshold value. The inkjet printer further includes a first sensor to detect that the support table has reached the first position, a second sensor to detect that the support table has reached the second position, a first determinator to determine that the waste liquid tank is in a near-end state when the support table is detected by the first sensor to have reached the first position, a second determinator to determine that the waste liquid tank is in an end state when the support table is detected by the second sensor to have reached the second position, and a notifier to notify a user of the near-end state when the first determinator determines that the waste liquid tank is in the near-end state.

With the inkjet printer, the support table supporting the waste liquid tank is displaceable in accordance with the weight of the liquid in the waste liquid tank. Therefore, the position of the support table is changeable in accordance with the amount of the waste liquid in the waste liquid tank. With such an arrangement, the storage state of the liquid in the waste liquid tank is detectable based on the position of the support table. In addition, the inkjet printer includes the first sensor to detect that the support table has reached the first position and the second sensor to detect that the support table has reached the second position. Therefore, the amount of the liquid stored in the waste liquid tank may be recognized accurately with no need to perform any computation based on the cleaning operation. Before the waste liquid tank is put into the end state, the inkjet printer may notify the user as an advance warning that the waste liquid tank is close to being in the end state, namely, is in the near-end state. Thus, the user may recognize easily that the waste liquid tank is close to being full. Therefore, the printing operation is not made inexecutable unexpectedly, and the user may discard the waste liquid at any timing, for example, after the waste liquid tank is put into the near-end state before the waste liquid tank is put into the end state. This improves the convenience for the user.

Preferred embodiments of the present invention provide inkjet printers each allowing a state where a waste liquid tank is full or is close to being full to be accurately recognized with no need to perform any complicated computation.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14A shows a case where a light blocking plate with no recessed portion is used, and FIG. 14B shows a case where a light blocking plate with a recessed portion is used.

DETAILED DESCRIPTION OF THE PREFERRED EMBODIMENTS

Preferred Embodiment 1

Hereinafter, preferred embodiments of inkjet printers (hereinafter, each referred to simply as a "printer") according to the present invention will be described with reference to the drawings as necessary. The preferred embodiments described herein are not intended to specifically limit the present invention, needless to say. Components and portions that have the same functions will bear the same reference signs, and overlapping descriptions will be omitted or simplified as necessary. In this specification, the "inkjet printer" refers to a printer in general that uses a printing method by a conventionally known inkjet technology, for example, a continuous method such as a binary deflection method, a continuous deflection method or the like, a thermal method, or any of various on-demand methods such as a piezoelectric element method or the like.

Figure 1:
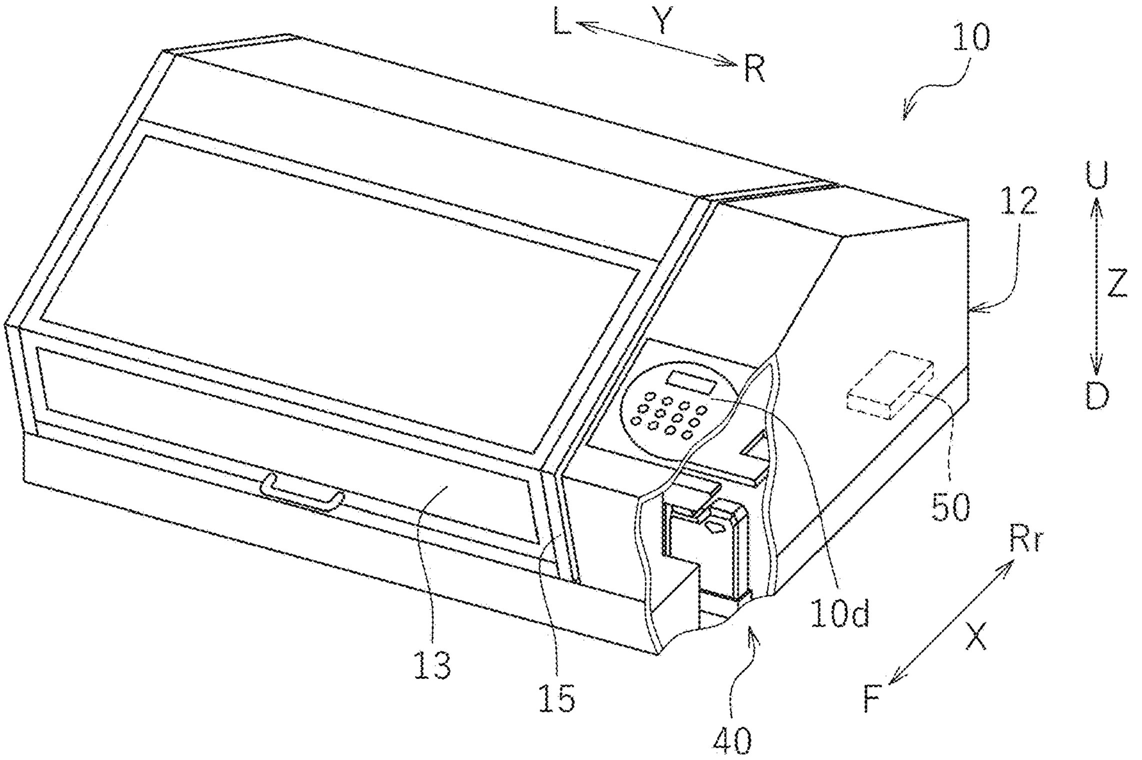
FIG. 1 is a perspective view of an inkjet printer according to a preferred embodiment of the present invention, with a right side portion thereof being partially cut away.
Figure 2:
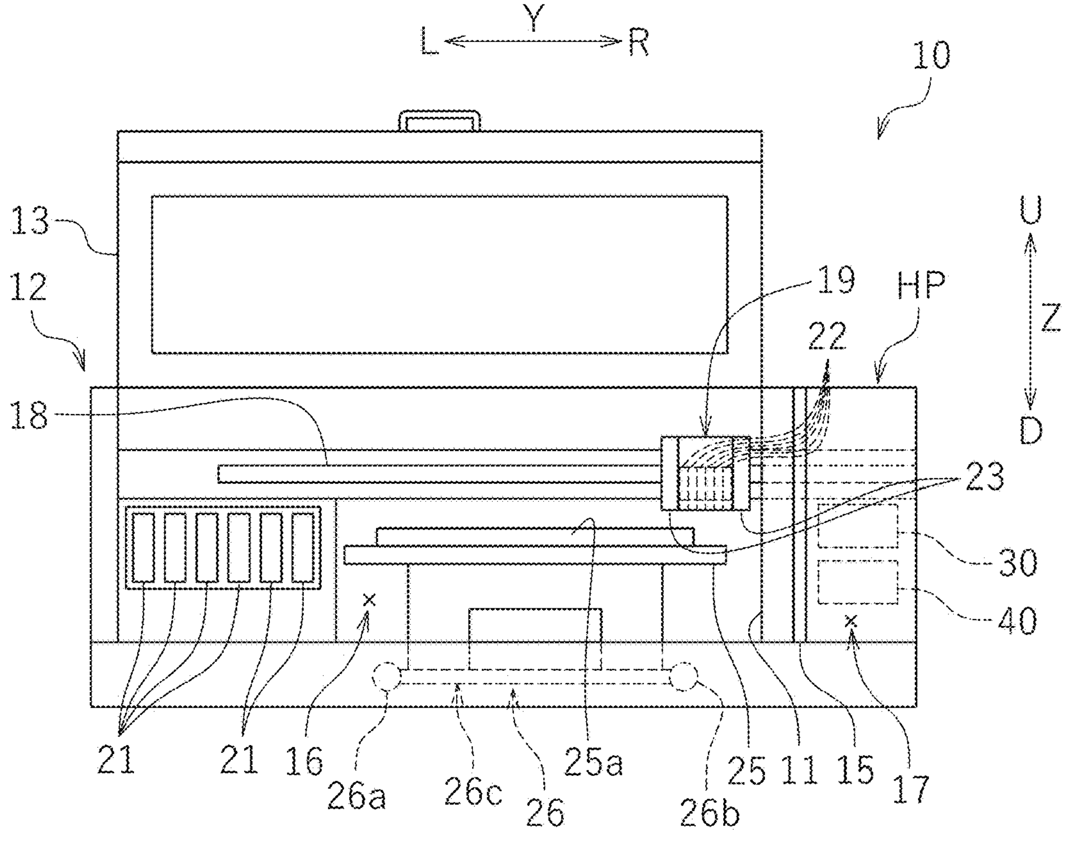
FIG. 2 is a front view of the inkjet printer according to a preferred embodiment of the present invention.

FIG. 1 is a perspective view of a printer 10, with a right side portion thereof being partially cut away. FIG. 2 is a front view of the printer 10 in a state where a front cover 13 thereof is open. In the following description, "left", "right", "up" and "down" are respectively left, right, up and down as seen from a user who is in front of the printer 10 (user of the printer 10), and "forward" is a direction getting closer to the user from the printer 10 whereas "rearward" is a direction getting farther from the user toward the printer 10. In the figures, letters F, Rr, L, R, U and D respectively represent "front", "rear", "left", "right", "up" and "down". In the figures, letters X, Y and Z respectively represent a front-rear direction, a left-right direction, and an up-down direction. These directions are merely defined for the sake of convenience, and do not limit the manner of installation of the printer 10 in any way.

The printer 10 is a device that receives printing data from an external device such as, for example, a host computer or the like and prints an image on a printing target 25*a* (see FIG. 2) based on the printing data. There is no specific limitation on the shape or the material of the printing target 25*a*. The material of the printing target 25*a* may be, for example, paper such as plain paper, inkjet printing paper or the like; a resin such as poly(vinyl chloride), acrylic resin, polycarbonate, polyester, polystyrene, acrylonitrile-butadiene-styrene (ABS) copolymer or the like; cloth such as woven cloth, unwoven cloth or the like; leather; a metal material such as aluminum, stainless steel or the like; carbon; pottery; a ceramic material; glass; rubber; or the like. In this specification, an "image" refers to an image formed on the printing target 25*a*, and there is no specific limitation on the content thereof. An image includes a letter, a numerical figure, a symbol, a graphic pattern, a drawing pattern, a decorative pattern, or the like.

As shown in FIG. 1, the printer 10 has a shape of a box extending in the left-right direction Y. As shown in FIG. 2, the printer 10 includes a casing 12 having an opening 11, and a front cover 13 covering the opening 11 such that the opening 11 is operable or closable. The front cover 13 is supported on a top surface of the casing 12 so as to be rotatable about a rear end thereof as an axis of rotation. The front cover 13 may be opened upward to allow an inner space of the casing 12 and a space outside the casing 12 to communicate with each other. The inner space of the casing 12 is partitioned by a partitioning member 15 extending in the up-down direction Z into a first area 16 and a second area 17, which are adjacent to each other in the left-right direction Y. The first area 16 is located to the left of the partitioning member 15. The printing on the printing target 25*a* is performed in the first area 16. The second area 17 is located to the right of the partitioning member 15. The second area 17 accommodates a cleaning mechanism 30, a waste liquid mechanism 40 and a controller (see FIG. 1).

Figure 12:
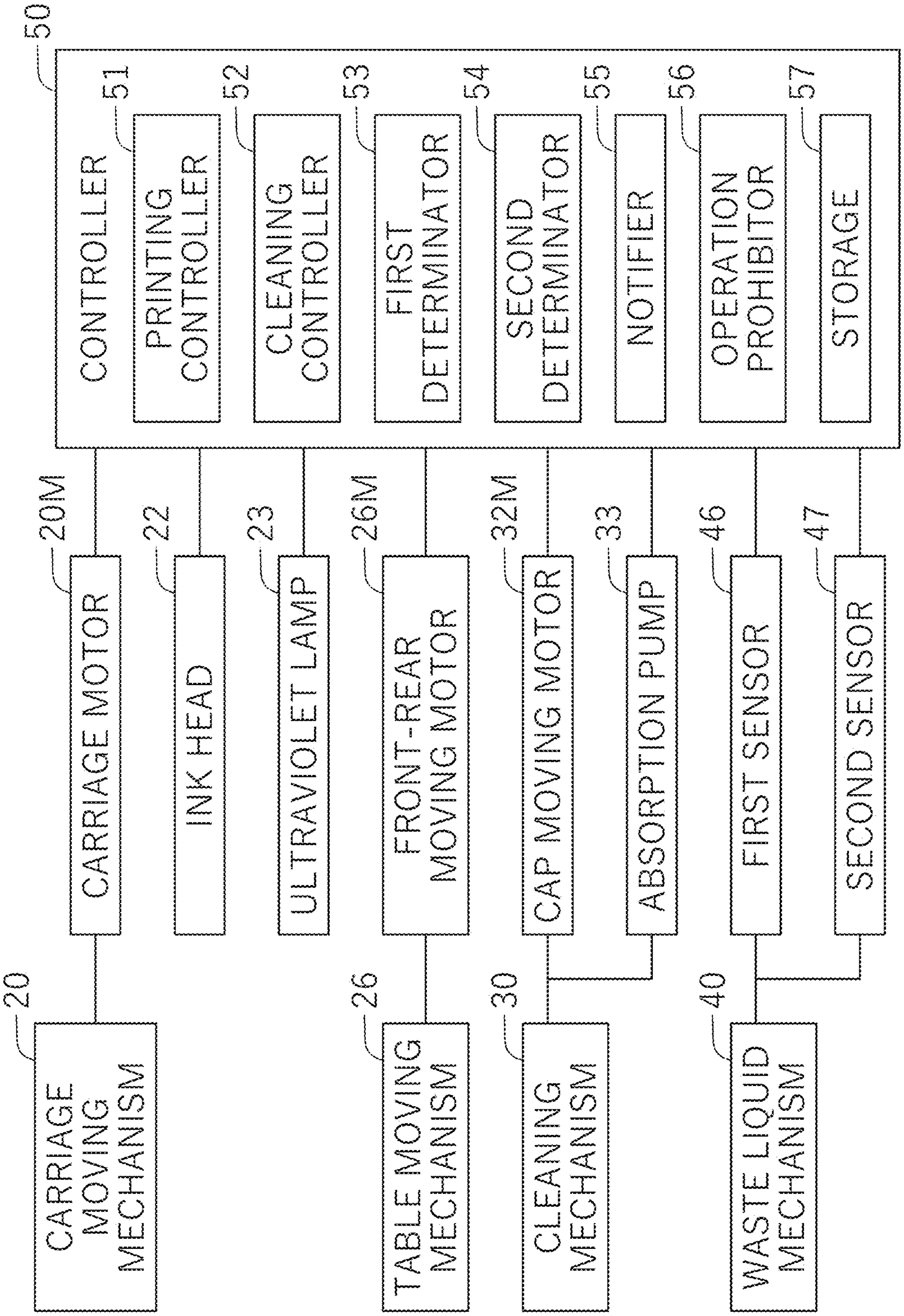
FIG. 12 is a functional block diagram showing a structure of a controller.

As shown in FIG. 2, the printer 10 includes a guide rail 18, a carriage 19, a carriage moving mechanism 20 (see FIG. 12), ink cartridges 21, ink heads 22, ultraviolet lamps 23, a table 25, a table moving mechanism 26, the cleaning mechanism 30, the waste liquid mechanism 40, and the controller 50 (see FIG. 1 and FIG. 12). In this preferred embodiment, the ink cartridges 21 and the table 25 are located in the first area 16. The cleaning mechanism 30 and the waste liquid mechanism 40 are located in a front portion of the second area 17. As shown in FIG. 1, the controller 50 is located in a rear portion of the second area 17. Hereinafter, each of the components will be described.

As shown in FIG. 2, the guide rail 18 is provided above the table 25. The guide rail 18 is secured to the casing 12, and extends in the left-right direction Y through the first area 16 and the second area 17. The carriage 19 is slidably provided along the guide rail 18. The guide rail 18 guides a movement of the carriage 19 in the left-right direction Y. The carriage 19 is movable by the carriage moving mechanism 20 in the left-right direction (main scanning direction) Y. While the printing is not performed, the carriage 19 waits at a home position HP.

The carriage moving mechanism 20 is configured to move the carriage 19 in the left-right direction Y with respect to the table 25. The carriage moving mechanism 20 includes a pair of pulleys (not shown) respectively located at a right end and a left end of the guide rail 18, an endless belt (not shown), and a carriage motor 20M (see FIG. 12). The carriage 19 is secured to the endless belt. The endless belt is wound along the pair of pulleys. One of the pulleys is coupled with the carriage motor 20M. The carriage motor 20M is electrically connected with the controller 50, and is controlled by the controller 50. When the carriage motor 20M is driven, the pulleys are rotated to run the belt. As a result, the carriage 19 moves in the left-right direction Y along the guide rail 18. It should be noted that the mechanism described herein is merely one example, and there is no specific limitation on the structure of the carriage moving mechanism 20.

As shown in FIG. 2, the carriage 19 preferably includes six ink heads 22 and two ultraviolet lamps 22 mounted thereon, for example. The printer 10 is an ultraviolet-curing-type printer. In this preferred embodiment, the six ink heads 22 are located in a line in the left-right direction Y. The six ink heads 22 are located in a so-called in-line arrangement. It should be noted that there is no specific limitation on the manner of arrangement of the ink heads 22. The ink heads 22 each includes a nozzle 22*a* (see FIG. 3) opened downward. The ink heads 22 are configured to inject ink toward the printing target 25*a* from the nozzles 22 for printing. The ink heads 22 are each an example of head that injects a liquid. The ink heads 22 are electrically connected with the controller 50. The injection of the ink from the nozzles 22*a* is controlled by the controller 50. The ink heads 22 are respectively in communication with the ink cartridges 21 via flexible ink tubes (not shown).

The ink cartridges 21 are containers that store the ink. As shown in FIG. 2, the ink cartridges 21 are not mounted on the carriage 19, but are located in a still state in the first area 16 of the casing 12. In the ink cartridges 21, photocurable ink containing a polymerizable compound and a polymerization initiator is stored. In this preferred embodiment, the photocurable ink is ultraviolet-curable ink (UV ink), which is cured by being irradiated with ultraviolet rays. In this preferred embodiment, the number of the ink cartridges 21 is six. The six ink cartridges 21 respectively store cyan ink (C), magenta ink (M), yellow ink (Y), black ink (K), white ink (WH) and gloss ink (GL). Although the number of the ink cartridges 21 is six in this preferred embodiment, the number of the ink cartridges 21 and the types of the ink are merely examples and are not limited to the above. The ink cartridges 21 do not need to store white ink and/or the gloss ink.

The ultraviolet lamps 23 are light radiation devices provided to cure the ink on the printing target 25*a*. As shown in FIG. 2, in this preferred embodiment, one ultraviolet lamp 23 is located at a left end, and another ultraviolet lamp 23 is located at a right end, of the assembly of the ink heads 22. Light radiating from the ultraviolet lamps 23 has a wavelength with which the ink is curable. The ultraviolet lamps 23 are, for example, LEDs (Light Emitting Diodes), fluorescent lamps (low-pressure mercury lamps), high-pressure mercury lamps, or the like. The ultraviolet lamps 23 are electrically connected with the controller 50, and are controlled by the controller 50. Although two ultraviolet lamps 23 are provided in this preferred embodiment, the number of the ultraviolet lamps 23 is merely an example and is not limited to two. The ultraviolet lamp(s) 23 may be provided only at the left end or the right end of the assembly of the ink heads 22. The ultraviolet lamp(s) 23 may be mounted on a carriage other than the carriage 19 having the ink heads 22 mounted thereon, or provided on a wall or the like of the casing 12 directly or indirectly.

The table 25 is a table on which the printing target 25*a* is to be placed for printing. As shown in FIG. 2, the table 25 is located below the carriage 19. The table 25 is a flat plate-like member, and has a flat surface as seen in a front view. The printer 10 is a so-called flat bed-type printer. The table 25 is movable by the table moving mechanism 26 in the front-rear direction X.

The table moving mechanism 26 is configured to move the table 25 in the front-rear direction X with respect to the carriage 19, the ink heads 22 and the ultraviolet lamps 23. The table moving mechanism 26 includes two slide rails 26*a* and 26*b*, a transportation member 26*c*, and a front-rear moving motor 26M (see FIG. 12). The slide rails 26*a* and 26*b* extend parallel to each other in the front-rear direction X. The transportation member 26*c* is slidable with respect to the slide rails 26*a* and 26*b*. The table 25 is supported above the transportation member 26*c*. The front-rear moving motor 26M is electrically connected with the controller 50, and is controlled by the controller 50. When the front-rear moving motor 26M is driven, the transportation member 26*c* moves along the slide rails 26*a* and 26*b*. As a result, the table 25 moves in the front-rear direction X. It should be noted that the mechanism described herein is merely one example, and there is no specific limitation on the structure of the table moving mechanism 26.

Figure 3:
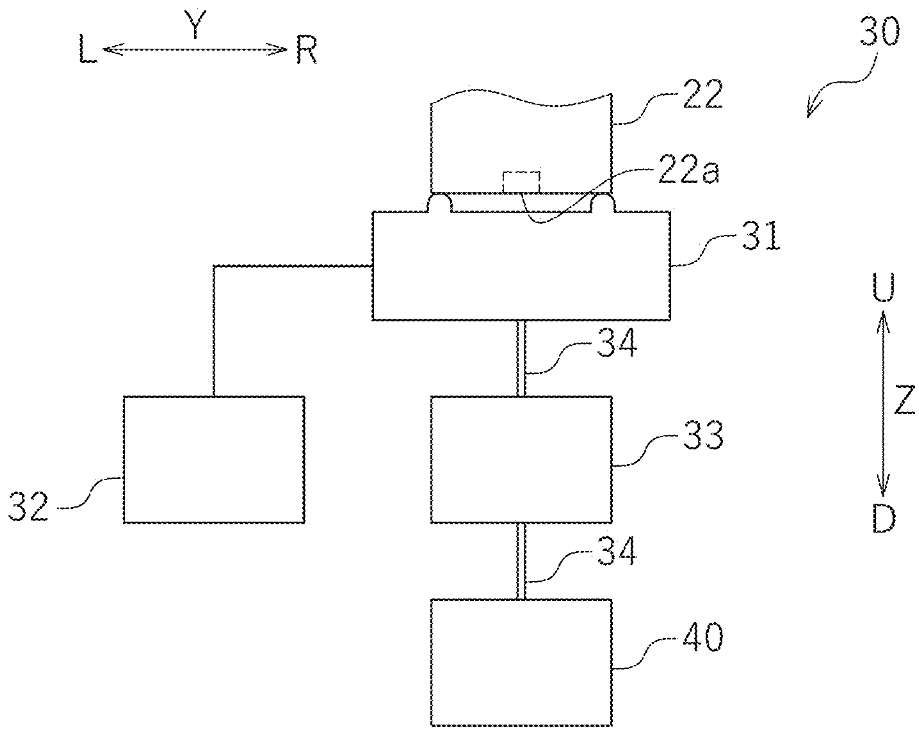
FIG. 3 is a schematic view showing a structure of a cleaning mechanism.

The cleaning mechanism 30 is configured to remove contaminants attached to the nozzle 22*a* of the ink head 22 (for example, dust, dross, thickened ink, cured ink, etc.). The cleaning mechanism 30 is located just below the carriage 19 when the carriage 19 is at the home position HP (see FIG. 2). FIG. 3 is a schematic view showing a structure of the cleaning mechanism 30. The cleaning mechanism 30 includes a cap 31, a cap moving mechanism 32, an absorption pump 33, and a waste liquid passage 34. In this preferred embodiment, one cleaning mechanism 30 is provided for each of the ink heads 22. It should be noted that a plurality of ink heads 22 may share some components of the cleaning mechanism 30. For example, a single cap moving mechanism 32 and/or a single absorption pump 33 may be provided for a plurality of (e.g., two) ink heads 22.

The cap 31 has a shape of, for example, a bottomed box having a top opening. The cap 31 surrounds the nozzle 22*a* of the ink head 22. As a result, a closed space is provided between the nozzle 22*a* and the cap 31. In this preferred embodiment, one cap 31 is provided for each of the ink heads 22. The number of the caps 31 is equal to the number of the ink heads 22, namely, is six. When being at the home position HP (see FIG. 2), the caps 31 are located just below the respective ink heads 22. The caps 31 are coupled with the cap moving mechanism 32. The caps 31 are detachably attached to the nozzles 22*a* of the ink heads 22 by the cap moving mechanism 32.

The cap moving mechanism 32 is a mechanism that attaches the caps 31 to the nozzles 22*a* of the ink heads 22 or detaches the caps 31 from the nozzles 22*a* of the ink heads 22. In this preferred embodiment, the cap moving mechanism 32 is a mechanism that supports the caps 31 and moves the caps 31 in the up-down direction Z. The cap moving mechanism 32 includes a cap moving motor 32M (see FIG. 12). The cap moving motor 32M is electrically connected with the controller 50, and is controlled by the controller 50. The cap moving motor 32M is driven to move the caps 31 with respect to the ink heads 22 between a cap position, at which the caps 31 cover the nozzles 22*a*, and a separated position, at which the caps 31 are separated from the nozzles 22*a*. FIG. 3 shows a state where the cap 31 is at the cap position, namely, a state where the cap 31 is attached to the nozzle 22*a*. It should be noted that the mechanism described herein is merely one example, and there is no specific limitation on the structure of the cap moving mechanism 32.

The waste liquid passage 34 is a flow path that guides the waste liquid from the cap 31 to the waste liquid mechanism 40 described below. A bottom end portion 34*d* (see FIG. 4) of the waste liquid passage 34 is in communication with a waste liquid tank 41 (see FIG. 4) of the waste liquid mechanism 40. The bottom end portion 34*d* is an example of outlet. The waste liquid passage 34 is formed of, for example, a flexible tube or the like. The waste liquid passage 34 is provided with the absorption pump 33 at the middle thereof. The absorption pump 33 is connected with a bottom surface of the cap 31. In the state where the cap 31 is attached to the nozzle 22*a*, the absorption pump 33 absorbs the ink or the like from the nozzle 22*a*. The absorption pump 33 transfers the ink or the like stored in the cap 31 to the waste liquid mechanism 40. The absorption pump 33 is, for example, a vacuum pump although not being limited thereto. The absorption pump 33 is electrically connected with the controller 50, and is controlled by the controller 50.

For cleaning the nozzle 22*a* of the ink head 22, when the absorption pump 33 is driven in the state where the cap 31 is attached to the nozzle 22*a*, the ink, the contaminants and the like are absorbed from the nozzle 22*a* via the cap 31 and is stored in the cap 31. When the ink head 22 is driven in the state where the cap 31 is attached to the nozzle 22*a*, the ink, the contaminants and the like are injected into the cap 31 and is stored in the cap 31. The cap 31 is in communication with the waste liquid mechanism 40 via the waste liquid passage 34. The ink, the contaminants and the like stored in the cap 31 are transferred to the waste liquid mechanism 40 as a waste liquid via the waste liquid passage 34.

The waste liquid mechanism 40 is a mechanism that recovers the waste liquid generated by the cleaning operation or the like, and also allows the storage state of the recovered waste liquid to be recognized. As shown in FIG. 2, the waste liquid mechanism 40 is located below the cleaning mechanism 30 at the home position HP. Now, the waste liquid mechanism 40 will be described in detail.

Figure 4:
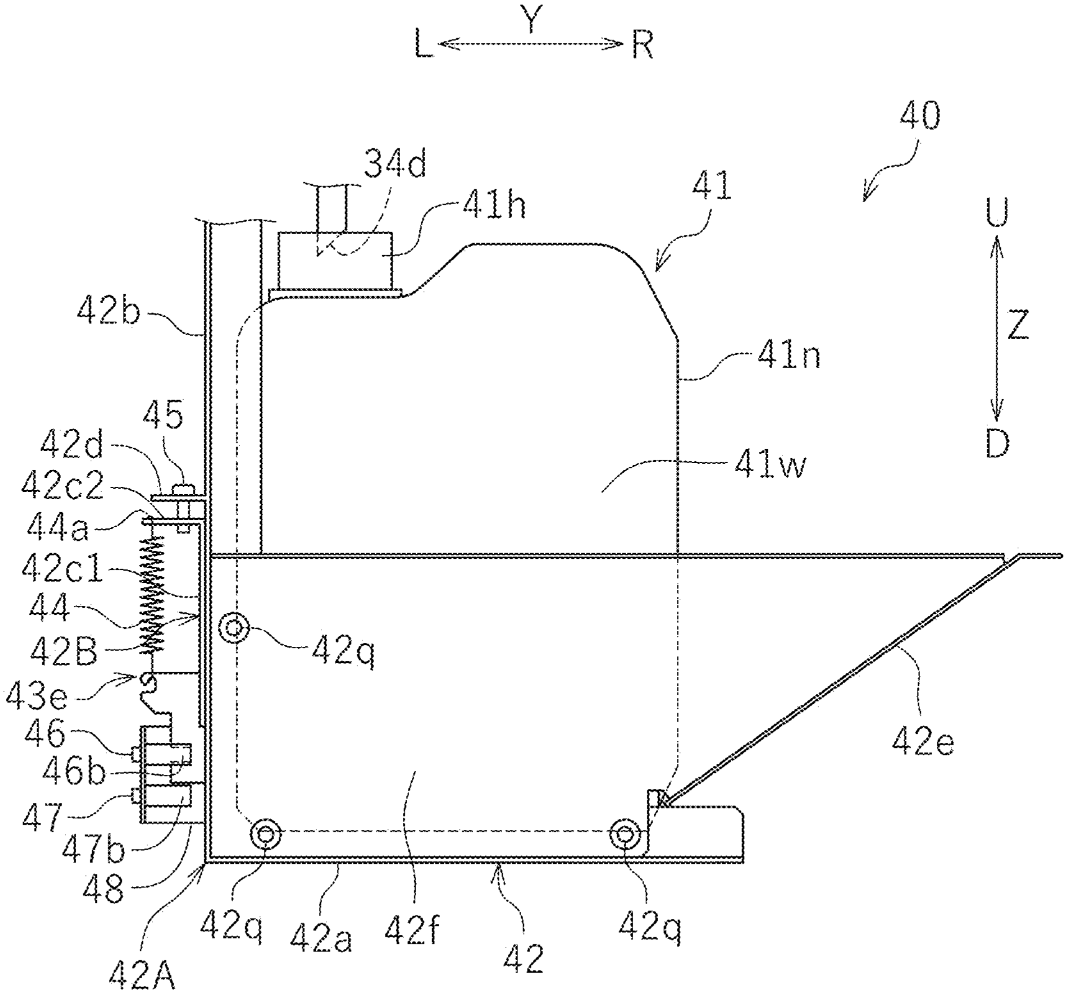
FIG. 4 is a front view of a waste liquid mechanism in a state where the support table is at an initial position.
Figure 5:
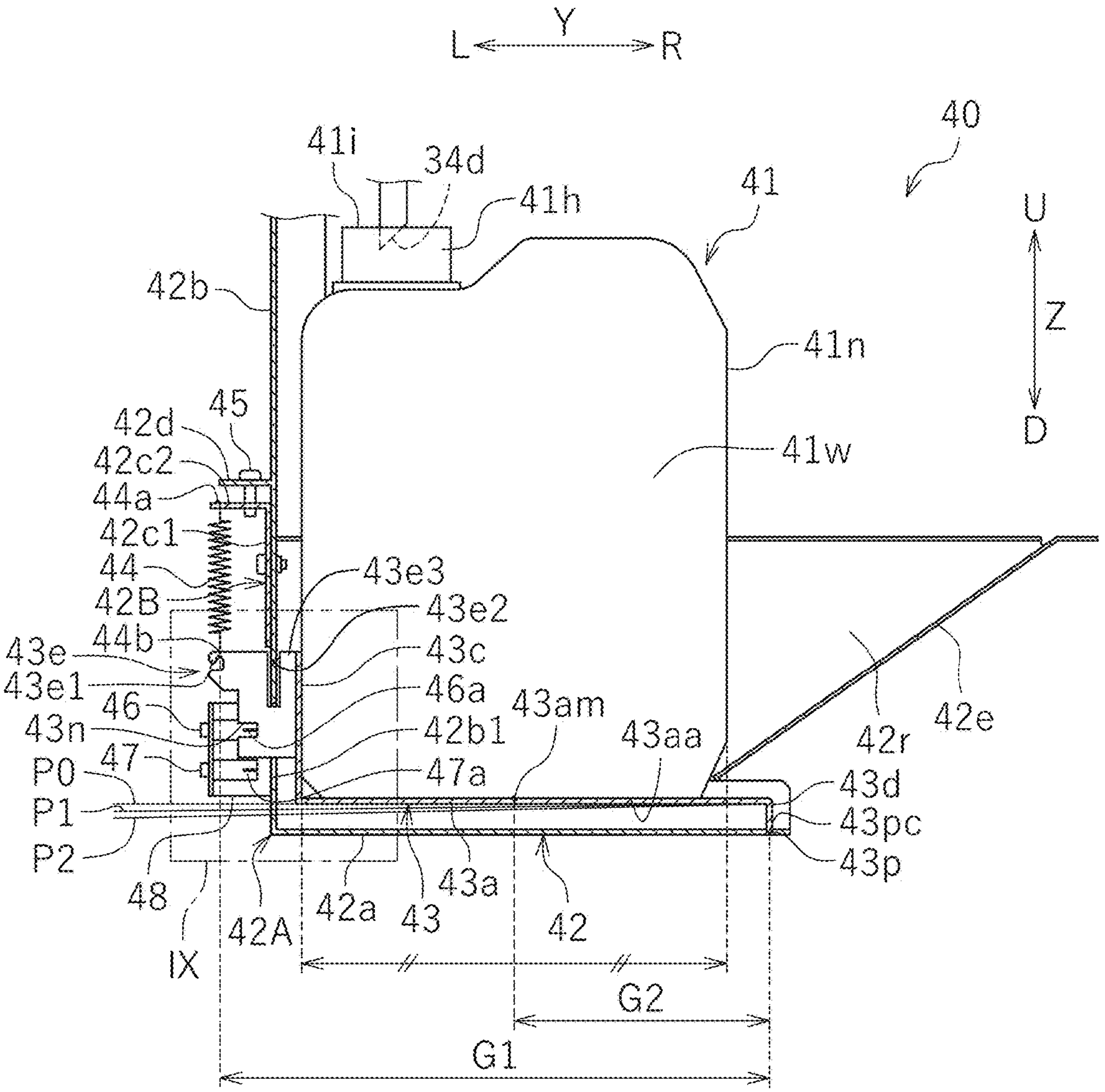
FIG. 5 is a vertical cross-sectional view of the waste liquid mechanism in the state where the support table is at the initial position.

FIG. 4 is a front view of the waste liquid mechanism 40. FIG. 5 is a vertical cross-sectional view of the waste liquid mechanism 40. The waste liquid mechanism 40 includes the waste liquid tank 41, a support table 43 (see FIG. 5) supporting the waste liquid tank 41, a base member 42 supporting the support table 43 such that the support table 43 is displaceable, a loading spring 44, a first sensor 46, and a second sensor 47.

The waste liquid tank 41 is a container to which the waste liquid containing ink that has not been used for printing (waste ink) is recovered. The waste liquid tank 41 stores the waste liquid. The waste liquid tank 41 is configured to receive the waste liquid from the waste liquid passage 34. In this preferred embodiment, the waste liquid tank 41 is located below the cleaning mechanism 30. The waste liquid tank 41 is located in the inner space of the printer 10. It should be noted that in another preferred embodiment, the waste liquid tank 41 may be located in the space outside the printer 10. The waste liquid tank 41 is formed of, for example, a resin such as polyethylene, polypropylene, silicone, a fluorine resin or the like. The waste liquid tank 41 may be black to block light. The waste liquid tank 41 has a capacity of, for example, 1000 ml or larger, preferably 1500 ml or larger, more preferably 2000 ml or larger, for example, 2000 to 10000 ml.

As shown in FIG. 5, the waste liquid tank 41 is placed on the support table 43. In this preferred embodiment, the waste liquid tank 41 has a flat parallelepiped shape by which the length in the front-rear direction X (direction perpendicular to the sheet of paper of FIG. 5) is shorter than the length in the left-right direction Y and the length in the up-down direction Z. The waste liquid tank 41 has a pair of (front and rear) wider planes 41*w*, and a pair of (left and right) narrow planes 41*n*. The wider planes 41*w* extend in the left-right direction Y and in the up-down direction Z. The narrow planes 41*n* extend in the front-rear direction X and in the up-down direction Z. It should be noted that there is no specific limitation on the shape or the position of the waste liquid tank 41. The waste liquid tank 41 may be, for example, cylindrical, cubic, parallelepiped, or the like. The waste liquid tank 41 includes a cylindrical neck portion 41*h*. The neck portion 41*h* has an opening 41*i* at a top end thereof, and the opening 41*i* is opened upward. The neck portion 41*h* has an inner diameter longer than an outer diameter of the bottom end portion 34*d* of the waste liquid passage 34. The bottom end portion 34*d* of the waste liquid passage 34 is inserted into the opening 41*i* of the neck portion 41*h*.

As shown in FIG. 4, the base member 42 includes a first base member 42A and a second base member 42B attached to the first base member 42A. There is no specific limitation on the material of the first base member 42A or the second base member 42B. The material of the first base member 42A and the second base member 42B is, for example, a metal material such as copper, stainless steel, aluminum, or the like.

The first base member 42A includes a bottom wall 42*a*, a vertical wall 42*b* extending upward from a left end of the bottom wall 42*a*, and an oblique wall 42*e* extending obliquely upward and rightward from a position above a right end of the bottom wall 42*a*. The vertical wall 42*b* has an arm portion 42*d* secured thereto, and the arm portion 42*d* protrudes leftward. The first base member 42A further includes a front wall 42*f* extending upward from a front end of the bottom wall 42*a*, and a rear wall 42*r* (see FIG. 5) extending upward from a rear end of the bottom wall 42*a*. The first base member 42A may be formed of one member. In this preferred embodiment, the first base member 42A includes a plurality of members that are assembled together by screws 42*q*.

Figure 6:
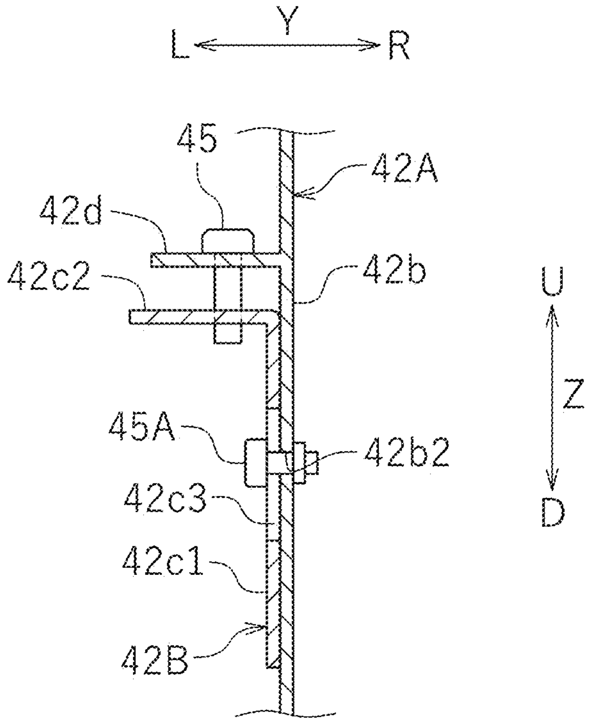
FIG. 6 is a partially enlarged view of a base member.
Figure 7:
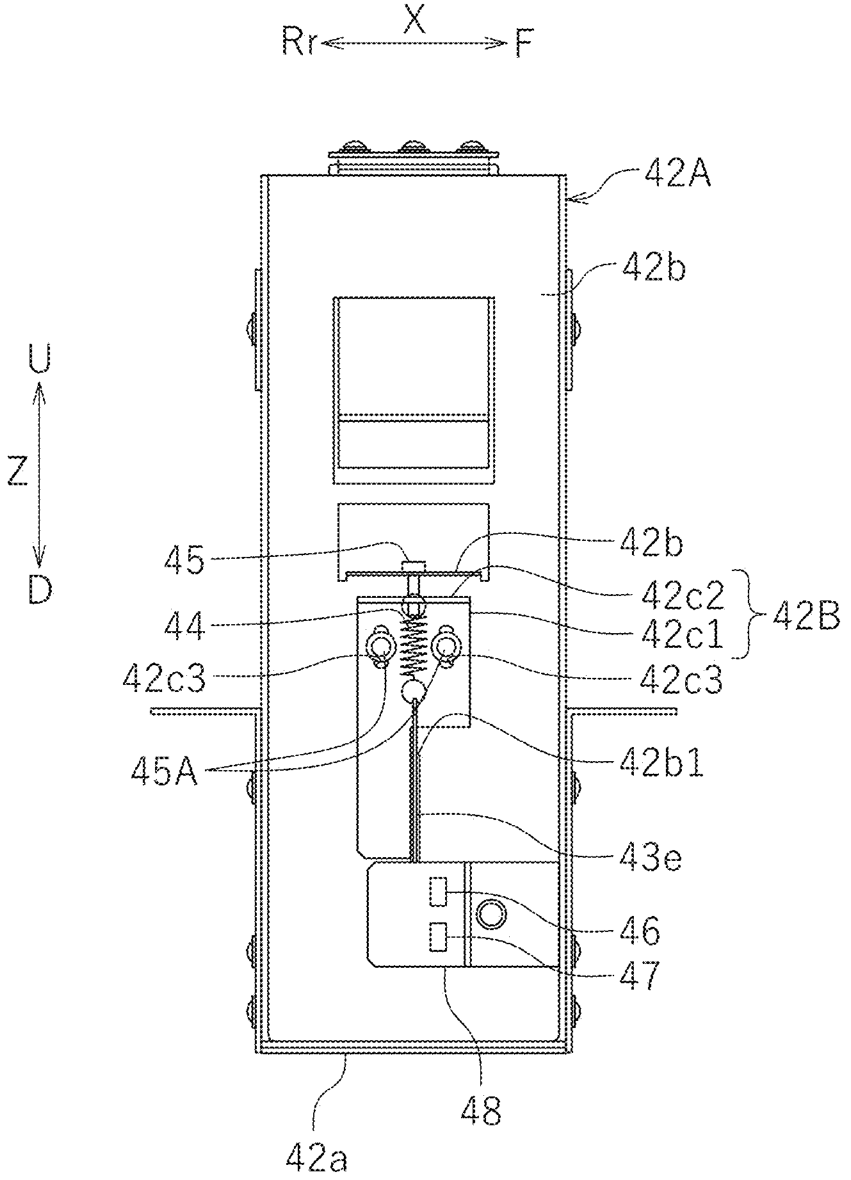
FIG. 7 is a left side view of the waste liquid mechanism.

The second base member 42B is inverted L-shaped. The second base member 42B includes a vertical wall 42*c*1 extending in the up-down direction Z along the vertical wall 42*b*, and an arm portion 42*c*2 extending leftward from a top end of the vertical wall 42*c*1. The arm portion 42*c*2 is located parallel to the arm portion 42*d*. As shown in FIG. 6 and FIG. 7, the vertical wall 42*c*1 has a slit 42*c*3 therein, and the slit 42*c*3 extends in the up-down direction. The vertical wall 42*b* has a screw hole 42*b*2 therein. A securing screw 45A is tightened through the slit 42*c*3 and the screw hole 42*b*2. The second base member 42B is attached to the first base member 42A via the securing screw 45A. The position of the securing screw 45A in the slit 42*c*3 is changeable in the up-down direction. The second base member 42B may be slid along the slit 42*c*3 to adjust the position thereof in the up-down direction with respect to the first base member 42A. The second base member 42B is attached to the first base member 42A such that the position in the up-down direction of the second base member 42B is adjustable. After the position of the second base member 42B is adjusted, the securing screw 45A is tightened to secure the second base member 42B to the first base member 42A.

An adjustment screws 45 is inserted through the arm portion 42*d* of the first base member 42A and the arm portion 42*c*2 of the second base member 42B. The adjustment screw 45, the arm portion 42*d* and the arm portion 42*c*2 are configured such that when the adjustment screw 45 is rotated in a first rotation direction, the arm portion 42*c*2 gets closer to the arm portion 42*d*, and when the adjustment screw 45 is rotated in a second rotation direction opposite to the first rotation direction, the arm portion 42*c*2 gets farther from the arm portion 42*d*. For example, the arm portion 42*d* may have a hole with no threads therein, the arm portion 42*c*2 may have a threaded hole therein, and the adjustment screw 45 may be slidably inserted into the hole in the arm portion 42*d* and screwed into the threaded hole of the arm portion 42*c*2. Alternatively, for example, the arm portion 42*d* and the arm portion 42*c*2 may both have a threaded hole screwable with the adjustment screw 45. The adjustment screw 45 may be rotated in a state where the securing screw 45A is loosened, so that the second base member 42B is moved upward or downward with respect to the first base member 42A. The adjustment screw 45 may be operated to adjust the position of the second base member 45B to a desired position and then the securing member 45A may be tightened, so that the position in the up-down direction of the second base member 42B is secured.

As shown in FIG. 5, the support table 43 is a table on which the waste liquid tank 41 is to be placed. The support table 43 includes a lateral plate portion 43*a*, a support plate portion 43*d* extending downward from a right end of the lateral plate portion 43*a*, a vertical plate portion 43*c* extending upward from a left end of the lateral plate portion 43*a*, and a light blocking plate 43*e* extending leftward from the vertical plate portion 43*c*. The support table 43 may include a front plate portion extending upward from a front end of the lateral plate portion 43*a* and a rear plate portion extending upward from a rear end of the lateral plate portion 43*a*. The provision of the front plate portion and the rear plate portion allows the position in the front-rear direction of the waste liquid tank 41 to be regulated, and thus may prevent the waste liquid tank 41 from being positionally shifted.

The waste liquid tank 41 is placed on the lateral plate portion 43*a*. In the following description, a portion, of the lateral plate portion 43*a*, on which the waste liquid tank 41 is to be placed (in other words, a portion to overlap the waste liquid tank 41 as seen from above) in a state where the support table 43 is at an initial position will be referred to as a "carrying portion 43*aa*".

Figure 8:
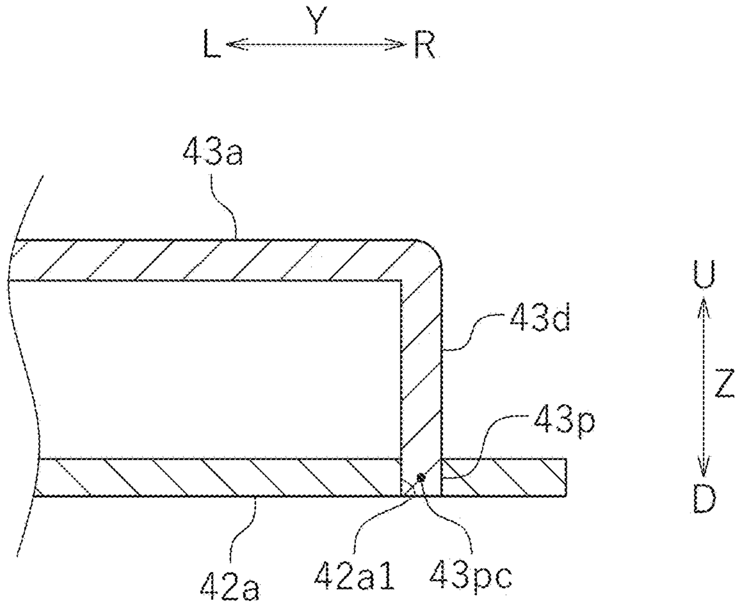
FIG. 8 is a partially enlarged view of a support table.

As shown in FIG. 8, a bottom end portion of the support plate portion 43*d* is inserted into a hole 42*a*1 in the bottom wall 42*a* of the base member 42. The support plate portion 43*d* is tiltably inserted into the hole 42*a*1. Therefore, the support table 43 is tiltable with the bottom end portion of the support plate portion 43*d* being the fulcrum. The support table 43 is tiltably supported by the bottom wall 42*a* of the base member 42. In this preferred embodiment, the bottom end portion of the support plate portion 43*d* acts as a fulcrum portion 43*p*. Reference sign 43*pc* represents the center of tilting.

The lateral plate portion 43*a*, the support plate portion 43*d* and the vertical plate portion 43*c* are integrally formed. The lateral plate portion 43*a*, the support plate portion 43*d* and the vertical plate portion 43*c* are integrally formed of a metal material such as, for example, copper, stainless steel, aluminum or the like. It should be noted that there is no specific limitation on the material of the lateral plate portion 43*a*, the support plate portion 43*d* or the vertical plate portion 43*c*. The light blocking plate 43*e* may be formed integrally with the vertical plate portion 43*c*. In this preferred embodiment, the light blocking plate 43*e* is separate from the vertical plate portion 43*c*, and is attached to the vertical plate portion 43*c*.

The loading spring 44 extends in the up-down direction Z. The loading spring 44 suspends and thus supports the support table 43. A first end portion 44*a* of the loading spring 44 is attached to the arm portion 42*c*2 of the second base member 42B. A second end portion 44*b* of the loading spring 44 is attached to the light blocking plate 43*e* of the support table 43. In this preferred embodiment, the loading spring 44 is a tension spring, and loads the support table 43 upward. The loading spring 44 generates an upward moment with the fulcrum portion 43*p* of the support table 43 being the center of pivoting. The loading spring 44 is an example of loading member. The loading spring 44 is, for example, a coil spring. It should be noted that the loading spring 44 may be any type of spring that loads the support table 43 upward. The loading spring 44 may be formed of, for example, an elastic material as rubber or the like.

In the following description, a predefined full state of the waste liquid tank 41 will be referred to as an "end state", and a state in which the waste liquid tank 41 is close to being the predefined full state will be referred to as a "near-end state". The end state may be a state where, for example, the amount of the waste liquid in the waste liquid tank 41 is about 70% by volume or larger, typically about 80% by volume or larger, for example, about 90% by volume or larger, of the total capacity of the waste liquid tank 41. The near-end state is a state where an amount of the waste liquid smaller than in the end state is recovered to the waste liquid tank 41, and may be a state where, for example, the amount of the waste liquid in the waste liquid tank 41 is about 60% by volume or larger, typically about 70% by volume or larger, for example, about 80% by volume or larger, of the total capacity of the waste liquid tank 41. For example, the difference between the end state and the near-end state may be about 5% by volume or larger, for example, about 10% by volume or larger, of the total capacity of the waste liquid tank 41.

The support table 43 is tilted by receiving the weight of the waste liquid tank 41 and the waste liquid in the waste liquid tank 41 (hereinafter, such a weight will be referred to simply as a "weight of the waste liquid tank 41"). As a result, the position of the support table 43 is changed (namely, the support table 43 is displaced). The support table 43 is displaced in accordance with the amount of the waste liquid in the waste liquid tank 41. Before the waste liquid is recovered to the waste liquid tank 41 (namely, when the amount of the waste liquid in the waste liquid tank 41 is zero), the lateral plate portion 43*a* of the support table 43 is generally horizontal. In this specification, the expression "generally horizontal" does not necessarily refer to a strictly horizontal state, but encompasses a state where the direction has a tilting angle of about 15 degrees or smaller, about 10 degrees or smaller, or about 5 degrees or smaller, with respect to the horizontal direction.

In FIG. 5, straight line P0 is a line extending from the lateral plate portion 43*a* in a state where the waste liquid is not recovered to the waste liquid tank 41. Hereinafter, this position of the support table 43 will be referred to as an "initial position". As the cleaning operation is repeated, the waste liquid is accumulated gradually in the waste liquid tank 41. As the amount of the waste liquid increases in the waste liquid tank 41, the weight of the waste liquid tank 41 increases, and the support table 43 is tilted counterclockwise in FIG. 5 with the fulcrum portion 43*p* being the fulcrum. The lateral plate portion 43*a* of the support table 43 is tilted obliquely downward and leftward from the generally horizontal position. Straight line P1 is a line extending from the lateral plate portion 43*a* when the weight of the waste liquid tank 41 reaches a predefined first threshold value. Hereinafter, this position of the support table 43 will be referred to as a "first position". Straight line P2 is a line extending from the lateral plate portion 43*a* when the weight of the waste liquid tank 41 reaches a predefined second threshold value. In this preferred embodiment, the second threshold value is larger than the first threshold value. Hereinafter, this position of the support table 43 will be referred to as a "second position". At the second position P2, the lateral plate portion 43*a* and the bottom wall 42*a* of the base member 42 may have an acute angle, more specifically, an angle of about 60 degrees or smaller, typically about 45 degrees or smaller, for example, about 30 degrees or smaller, although the angle is not limited to such degrees.

The first threshold value is set to the weight of the waste liquid tank 41 when the waste liquid tank 41 is in the near-end state. The second threshold value is set to the weight of the waste liquid tank 41 when the waste liquid tank 41 is in the end state. In this preferred embodiment, the adjustment screw 45 may be operated to adjust the position in the up-down direction of the second base member 42B. The adjustment screw 45 may be operated to adjust the loading force of the loading spring 44, so that a work of matching the first threshold value and the first position P1 and a work of matching the second threshold value and the second position P2 are performed easily.

The first sensor 46 and the second sensor 47 are members that detect the position of the support table 43. In this preferred embodiment, the first sensor 46 and the second sensor 47 detect the position of the light blocking plate 43*e* of the support table 43, and thus detects the position of the support table 43. It should be noted that the first sensor 46 and/or the second sensor 47 may detect the position of another portion of the support table 43. The first sensor 46 is configured to detect that the support table 43 has reached the first position P1. The second sensor 47 is configured to detect that the support table 43 has reached the second position P2.

As shown in FIG. 4, the vertical wall 42*b* of first base member 42A has a bracket 48 attached thereto. The first sensor 46 and the second sensor 47 are secured to the bracket 48. The first sensor 46 and the second sensor 47 are located to the left of the vertical wall 42*b* of the first base member 42A. The second sensor 47 is located below the first sensor 46.

The first sensor 46 and the second sensor 47 may each be a contact sensor or a non-contact sensor. In this preferred embodiment, the first sensor 46 and the second sensor 47 are each a photosensor, which is a type of non-contact sensor. The first sensor 46 and the second sensor 47 may each be a light-reflecting photosensor, but in this preferred embodiment, are each a light-transmissive photosensor. In the case where a light-reflecting photosensor is used, it is preferred to use a reflector instead of the light blocking plate 43*e*.

Figure 9:
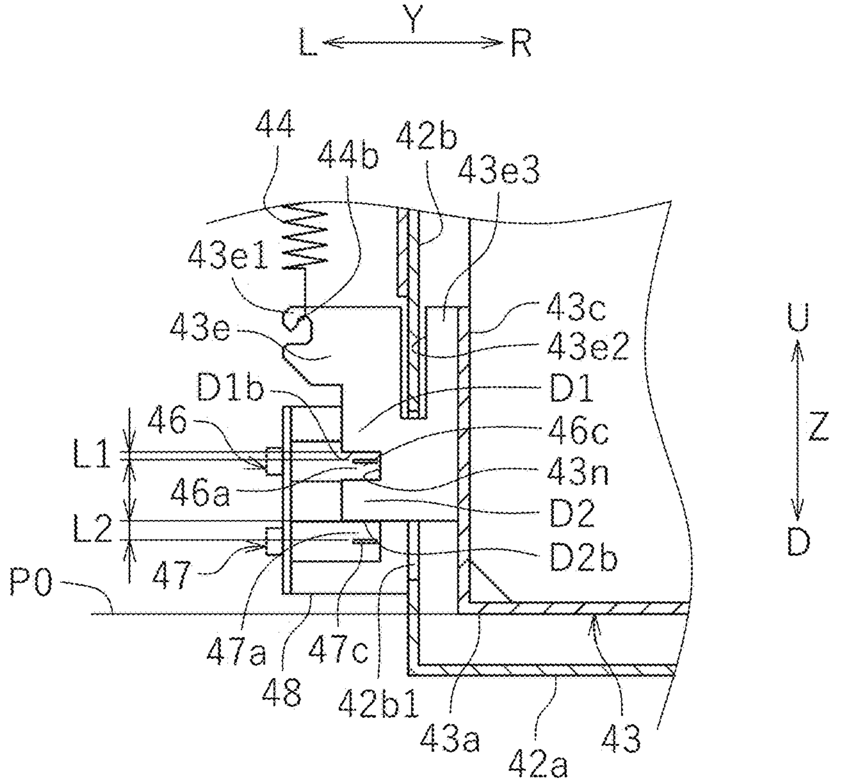
FIG. 9 is an enlarged view of the IX portion in FIG. 5.

As shown in FIG. 9, the first sensor 46 includes a light emitting portion 46*a* radiating light along a first optical axis 46*c* extending in the front-rear direction (direction perpendicular to the sheet of paper of FIG. 9). The second sensor 47 includes a light emitting portion 47*a* radiating light along a second optical axis 47*c* extending in the front-rear direction. As shown in FIG. 4, the first sensor 46 includes a light receiving portion 46*b* receiving the light radiating from the light emitting portion 46*a*. The second sensor 47 includes a light receiving portion 47*b* receiving the light radiating from the light emitting portion 47*a*. The light emitting portions 46*a* and 47*a* and the light receiving portions 46*b* and 47*b* are located to face each other in the front-rear direction X. The first sensor 46 and the second sensor 47 are electrically connected with the controller 50, and are controlled by the controller 50.

The light blocking plate 43*e* is located between the light emitting portion 46*a* and the light receiving portion 46*b* of the first sensor 46 and between the light emitting portion 47*a* and the light receiving portion 47*b* of the second sensor 47. Namely, the light blocking plate 43*e* is located to the front of the light emitting portions 46*a* and 47*a* and to the rear of the light receiving portions 46*b* and 47*b*. As shown in FIG. 9, the light blocking plate 43*e* includes a combined portion 43*e*3 continuous from the vertical plate portion 43*c*, a groove 43*e*2 in engagement with the vertical wall 42*b*, a first light blocking portion D1, and a second light blocking portion D2 located below the first light blocking portion D1. The combined portion 43*e*3 is located to the right of the vertical wall 42*b*, and the first light blocking portion D1 and the second light blocking portion D2 are located to the left of the vertical wall 42*b*. The light blocking plate 43*e* has a recessed portion 43*n* formed between the first light blocking portion D1 and the second light blocking portion D2. The recessed portion 43*n* is recessed to a position to the right of the first optical axis 46*c* and the second optical axis 47*c*. In the state where the support table 43 is at the initial position P0, distance L1 in the up-down direction between a bottom edge D1b of the first light blocking portion D1 and the first optical axis 46*c* is shorter than distance L2 in the up-down direction between a bottom edge D2b of the second light blocking portion D2 and the second optical axis 47*c*.

Figure 10:
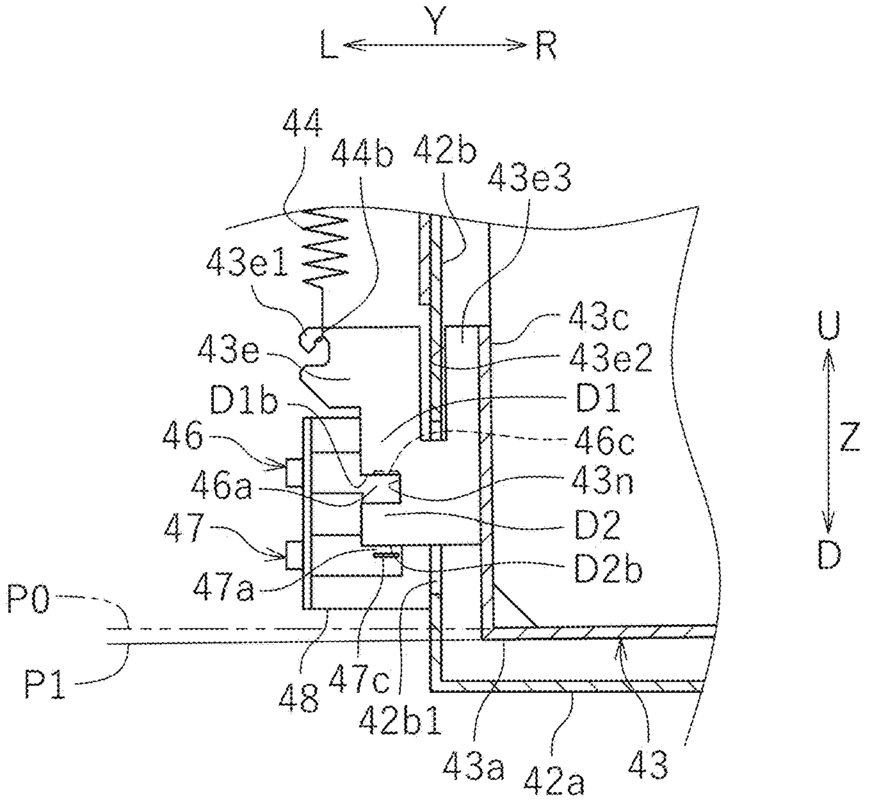
FIG. 10 is a view corresponding to FIG. 9 in a state where the support table is at a first position.
Figure 11:
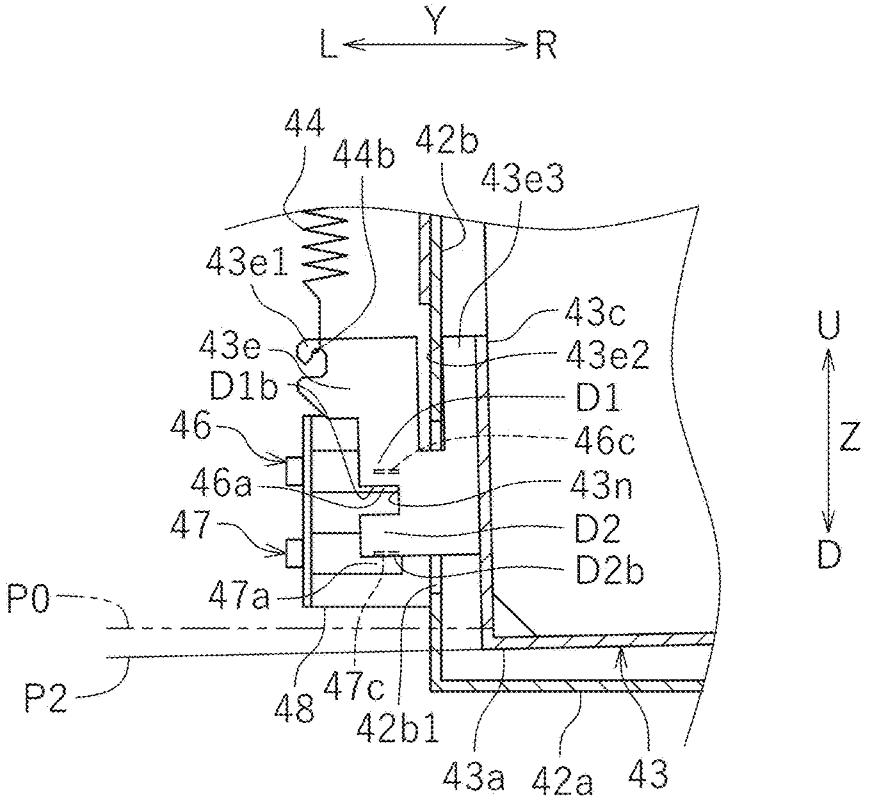
FIG. 11 is a view corresponding to FIG. 9 in a state where the support table is at a second position.

As described above, the support table 43 is tilted with the fulcrum portion 43*p* (see FIG. 5) being the fulcrum. Along with the tilting of the support table 43, the light blocking plate 43*e* moves in the up-down direction (more strictly, swings in the up-down direction). As shown in FIG. 9, in the state where the support table 43 is at the initial position P0, the first light blocking portion D1 does not cross the first optical axis 46*c* and the second light blocking portion D2 does not cross the second optical axis 47*c*. In this case, the first sensor 46 and the second sensor 47 are in an OFF state. When, as shown in FIG. 10, the light blocking plate 43*e* moves downward and the support table 43 reaches the first position P1, the first light blocking portion D1 crosses the first optical axis 46*c*, and the first sensor 46 is put into an ON state, in which the first sensor 46 detects the first light blocking portion D1. Namely, when the support table 43 moves to the first position P1 and the first light blocking portion D1 overlaps the first optical axis 46*c*, light radiating from the light emitting portion 46*a* is blocked by the first light blocking portion D1, and the first sensor 46 is put into an ON state. When, as shown in FIG. 11, the light blocking plate 43*e* moves further downward and the support table 43 reaches the second position P2, the second light blocking portion D2 crosses the second optical axis 47*c*, and the second sensor 47 is put into an ON state, in which the second sensor 47 detects the second light blocking portion D2. Namely, when the support table 43 moves to the second position P2 and the second light blocking portion D2 overlaps the second optical axis 47*c*, light radiating from the light emitting portion 47*a* is blocked by the second light blocking portion D2, and the second sensor 47 is put into an ON state.

The support table 43 is tilted. Therefore, a portion of the support table 43 farther from the fulcrum portion 43*p*, among various portions of the support table 43, is displaced by a larger amount. As shown in FIG. 5, in this preferred embodiment, the light blocking plate 43*e* is located farther from the fulcrum portion 43*p* than the carrying portion 43*aa* of the support table 43. The carrying portion 43*aa* is located between the light blocking plate 43*e* and the fulcrum portion 43*p*. Therefore, the amount of displacement of the light blocking plate 43*e* is larger. For this reason, the displacement of the support table 43 may be detected better by the first sensor 46 and the second sensor 47.

As shown in FIG. 9, the vertical wall 42*b* of the base member 42 has a slit 42*b*1 therein. The light blocking plate 43*e* is inserted into the slit 42*b*1. The light blocking plate 43*e* crosses the vertical wall 42*b*. The light blocking plate 43*e* is movable in the up-down direction. However, when the light blocking plate 43*e* contacts a top edge of the slit 42*b*1, an upward movement of the light blocking plate 43*e* is restricted. When the light blocking plate 43*e* contacts a bottom edge of the slit 42*b*1, a downward movement of the light blocking plate 43*e* is restricted. In this manner, the insertion of the light blocking plate 43*e* into the slit 42*b*1 restricts the position in the up-down direction of the light blocking plate 43*e* to a predetermined range. As a result, the range of tilting of the support table 43 is restricted to a predetermined range, and the support table 43 is prevented from being tilted excessively.

As described above, the second end portion 44*b* of the loading spring 44 is attached to the light blocking plate 43*e*. In this preferred embodiment, a portion, of the support table 43, to which the loading spring 44 is attached will be referred to as an "engagement portion 43*e*1". The engagement portion 43*e*1 is a portion provided with an upward force by the loading spring 44. As shown in FIG. 5, the carrying portion 43*aa* is located between the fulcrum portion 43*p* and the engagement portion 43*e*1. As seen along the tilting center line 43*pc* of the support table 43 in the state where the support table 43 is at the initial position P0, distance G1 in the horizontal direction between the engagement portion 43*e*1 and the fulcrum portion 43*p* may be at least 1.5 times, preferably at least twice, for example, about 2 to 5 times of distance G2 in the horizontal direction between a central position 43*am* in the horizontal direction of the carrying portion 43*aa* and the fulcrum portion 43*p*. Such a structure allows the load on the loading spring 44 to be small.

The controller 50 controls each of the components of the printer 10. In this preferred embodiment, the controller 50 is a computer specific for the printer 10 and located in the casing 12. The controller 50 is, for example, a microcomputer. It should be noted that the controller 50 may be, for example, a general-purpose personal computer or the like that is located outside the casing 12 and communicably connected with the printer 10 in a wired manner or wirelessly.

There is no specific limitation on the hardware configuration of the controller 50. The controller 50 includes, for example, an interface (I/F) receiving printing data from an outer device such as a host computer or the like, a central processing unit (CPU) executing commands of a control program, a ROM (read only memory) storing the programs to be executed by the CPU, a RAM (random access memory) usable as a working area in which the programs are developed, and a storage device, such as a memory or the like, storing the above-mentioned programs and various types of data.

FIG. 12 is a functional block diagram of the controller 50. As shown in FIG. 12, the controller 50 is configured or programmed to include a printing controller 51, a cleaning controller 52, a first determinator 53, a second determinator 54, a notifier 55, an operation prohibitor 56, and a storage 57. The components of the controller 50 are mutually communicable. Each of the components of the controller 50 may be formed of software or hardware. Each of the components of the controller 50 may be realized by one or a plurality of processors or may be incorporated into a circuit. The controller 50 is communicably connected with, and is configured or programmed to control, each of the carriage motor 20M of the carriage moving mechanism 20, the ink heads 22, the ultraviolet lamps 23, the front-rear moving motor 26M of the table moving mechanism 26, the cap moving motor 32M and the absorption pump 33 of the cleaning mechanism 30, and the first sensor 46 and the second sensor of the waste liquid mechanism 40.

The printing controller 51 is a controller that executes the printing operation of printing an image on the printing target 25*a* placed on the table 25 based on the printing data. The printing controller 51 controls the carriage motor 20M of the carriage moving mechanism 20 to move the carriage 19 in the left-right direction Y, and also controls the front-rear moving motor 26M of the table moving mechanism 26 to move the table 25 in the front-rear direction X. As a result, the printing controller 51 controls the positional relationship between the printing target 25*a* and the ink heads 22. The printing controller 51 controls the ink heads 22 to inject the ink from the nozzles 22*a* toward the printing target 25*a*. After the ink is injected from the nozzles 22*a* toward the printing target 25*a*, the printing controller 51 controls the ultraviolet lamps 23 to radiate ultraviolet rays toward the ink on the printing target 25*a*.

The cleaning controller 52 is configured or programmed to execute the cleaning operation in order to allow the ink to be injected stably from the nozzles 22*a* of the ink heads 22. The cleaning controller 52 may be configured or programmed to execute a predetermined cleaning operation periodically. The cleaning controller 52 may be configured or programmed to execute the predetermined cleaning operation, at, for example, at least one of timings among before the printing controller 51 executes the printing operation, while the printing controller 51 is executing the printing operation, and after the printing controller 51 executes the printing operation. The storage 57 may have one or a plurality of processes of the cleaning operation stored thereon in advance. The cleaning controller 52 may be configured or programmed to execute the cleaning operation upon receipt of an instruction from the user in the case where, for example, the user recognizes a printing fault caused to the image. The cleaning controller 52 is configured or programmed to execute, for example, at least one of an ink flushing operation and an ink absorption operation.

An example of ink flushing operation is executed as follows. The cleaning controller 52 drives the cap moving motor 32M of the cleaning mechanism 30 to attach the cap 31 to each of the nozzles 22*a* of the ink heads 22. In the state where the cap 31 is attached to each of the nozzles 22*a*, the cleaning controller 52 controls the ink heads 22 to inject the ink from the nozzles 22*a* toward the caps 31. An example of ink absorption operation is executed as follows. The cleaning controller 52 drives the cap moving motor 32M of the cleaning mechanism 30 to attach the cap 31 to each of the nozzles 22*a* of the ink heads 22. In the state where the cap 31 is attached to each of the nozzles 22*a*, the cleaning controller 52 controls the absorption pump 33 to absorb the ink from each of the nozzles 22*a* and discharge the ink toward the cap 31.

The first determinator 53 is a controller that executes a first determination operation of determining whether the first sensor 46 is in an ON state or an OFF state. The first determinator 53 is communicably connected with the light receiving portion 46*b* of the first sensor 46. An amount of received light is input from the light receiving portion 46*b* to the first determinator 53. When the amount of received light is changed to a level lower than, or equal to, a predefined reference value, the first determinator 53 detects that the first sensor 46 is switched from the OFF state to the ON state. The reference value is stored on the storage 57 in advance. Based on the first sensor 46 being in the ON state, the first determinator 53 determines that the waste liquid tank 41 has been put into the near-end state and that the support table 43 has been displaced to the first position P1 (see FIG. 10).

The second determinator 54 is a controller that executes a second determination operation of determining whether the second sensor 47 is in an ON state or an OFF state. The second determinator 54 is communicably connected with the light receiving portion 47*b* of the second sensor 47. An amount of received light is input from the light receiving portion 47*b* to the second determinator 54. When the amount of received light is changed to a level lower than, or equal to, a predefined reference value, the second determinator 54 detects that the second sensor 47 is switched from the OFF state to the ON state. The reference value is stored on the storage 57 in advance. Based on the second sensor 47 being in the ON state, the second determination 54 determines that the waste liquid tank 41 has been put into the end state and that the support table 43 has been displaced to the second position P2 (see FIG. 11).

The notifier 55 is a controller that notifies the user of a storage state of the waste liquid in the waste liquid tank 41 based on at least the determination result of the first determinator 53. In the case where the first determinator 53 determines that the waste liquid tank 41 is in the near-end state, the notifier 55 may notify the user that the waste liquid tank 41 is close to being full and/or that the waste liquid needs to be discarded. Alternatively, the amount of the waste liquid or the storage state of the waste liquid (percentage with respect to 100% as the predefined end state) may be associated with the ON/OFF state of the first sensor 46 in the storage 57 in advance. In this case, the notifier 55 may notify the user of the amount of the waste liquid or the storage state of the waste liquid. In the case where the second determinator 54 determines that the waste liquid tank 41 is in the end state, the notifier 55 may notify the user that the waste liquid tank 41 is full and/or the waste liquid needs to be discarded. The notifier 55 may notify such information with a letter(s), a graphic illustration or the like to, for example, a display screen 10*d* (see FIG. 1) provided in the printer 10, or notify such information by an audio signal such as an alarm sound or the like. This allows the user to recognize the storage state or the like of the waste liquid in the waste liquid tank 41.

The operation prohibitor 56 is configured or programmed to control the state of the printer 10 based on the determination result of the second determinator 54. The operation prohibitor 56 may be configured or programmed not to, in the case where the second determinator 54 determines that the waste liquid tank 41 is full, activate the printer 10 even if the user issues an instruction to start printing. The operation prohibitor 56 may be configured or programmed to, in the case where the second determinator 54 determines that the waste liquid tank 41 is full, pause or stop the printing operation or the cleaning operation. For example, the operation prohibitor 56 may be configured or programmed to, in the case where the second determinator 54 determines that the waste liquid tank 41 is full, pause the injection of the ink from the ink heads 22 or to stop the driving of the absorption pump 33. As a result, waste liquid is prevented from being newly generated in the state where the waste liquid tank 41 is full.

Figure 13:
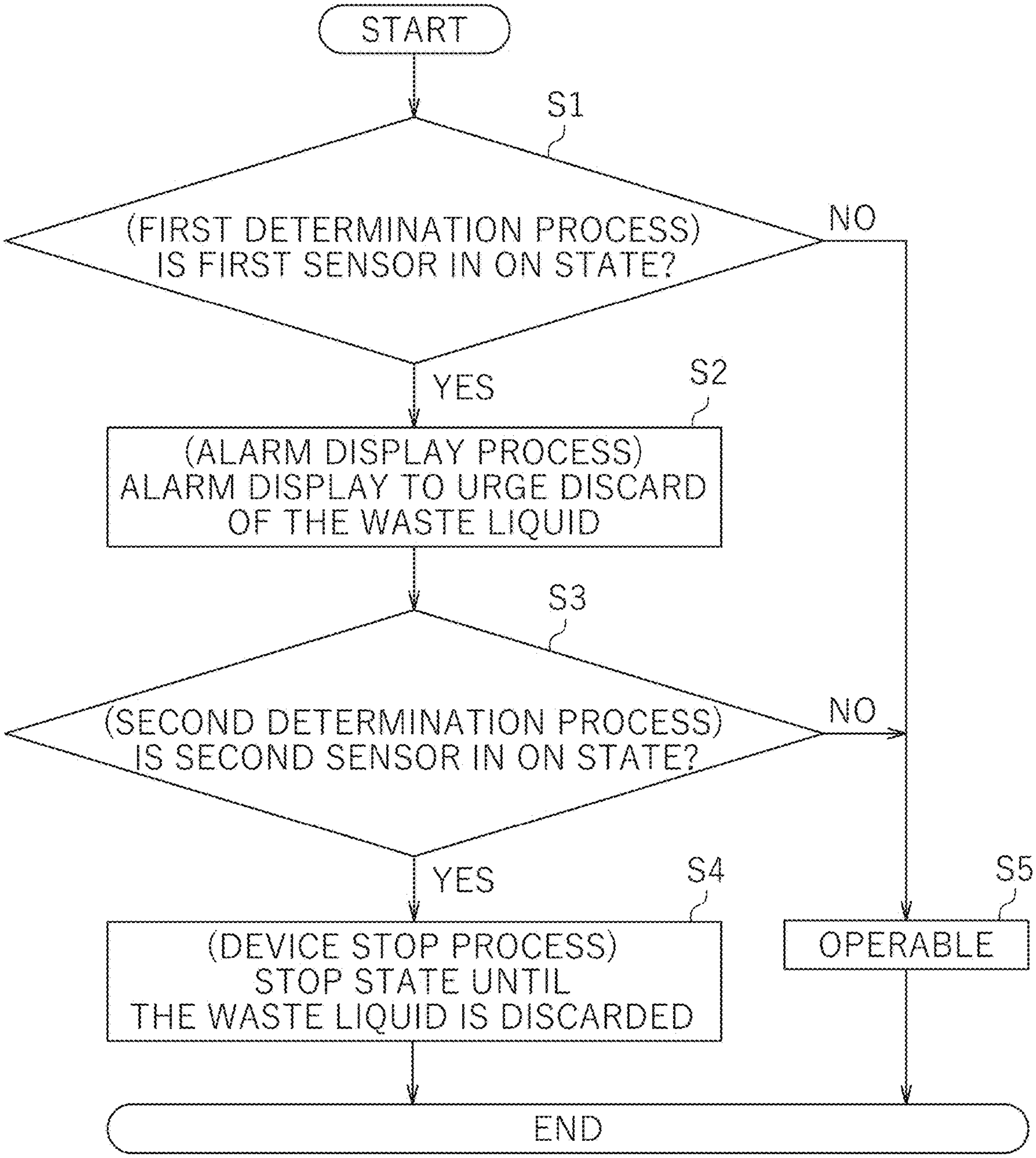
FIG. 13 is a flowchart showing an example of procedure of detecting an amount of a waste liquid.

FIG. 13 is a flowchart showing an example of procedure of detecting the amount of the waste liquid in the waste liquid tank 41. In this preferred embodiment, the controller 50 executes the procedure shown in FIG. 13 at, for example, at least one of timings among before the printing controller 51 executes the printing operation, and before the cleaning controller 52 executes the cleaning operation. It should be noted that the controller 50 may execute the procedure of detecting the amount of the waste liquid at another timing. For example, the controller 50 may execute the procedure shown in FIG. 13 periodically at a predetermined time interval after the cleaning controller 52 starts operating. The time interval may be stored on the storage 57 in advance.

In a first determination process in step S1, the first determination operation of determining whether the first sensor 46 is in an ON state or an OFF state is executed. The first determinator 53 is configured or programmed to execute the first determination operation. The first determinator 53 determines whether the first sensor 46 is in an ON state or an OFF state based on the amount of light received by the light receiving portion 46*b*. In the case where the first sensor 46 is not in the ON state (is in the OFF state), the first determinator 53 determines "No", and the procedure advances to step S5. In step S5, the printer 10 is determined as being operable. As a result, the printer 10 is allowed to advance to the printing operation or the cleaning operation. By contrast, in the case where the first sensor 46 is in the ON state, the first determinator 53 determines "Yes" in step S1, and the procedure advances to step S2.

In an alarm display process in step S2, an alarm display operation is executed, by which an alarm is displayed to urge the user to discard the waste liquid stored in the waste liquid tank 41. The notifier 55 is configured or programmed to execute the alarm display process. The notifier 55 displays a message that, for example, "Discard the waste liquid in the waste liquid tank 41." on the display screen 10*d* (see FIG. 1). Then, the procedure advances to step S3.

In a second determination process in step S3, the second determination operation of determining whether the second sensor 47 is in an ON state or an OFF state is executed. The second determinator 54 is configured or programmed to execute the second determination operation. The second determinator 54 determines whether the second sensor 47 is in an ON state or an OFF state based on the amount of light received by the light receiving portion 47*b*. In the case where the second sensor 47 is not in the ON state (is in the OFF state), the second determinator 54 determines "No", and the procedure advances to step S5. In step S5, the printer 10 is determined as being operable. As a result, the printer 10 is allowed to advance to the printing operation or the cleaning operation. By contrast, in the case where the second sensor 47 is in the ON state, the second determinator 54 determines "Yes" in step S3, and the procedure advances to step S4.

In a device stop process in step S4, a lock operation of locking the printer 10 into an inoperable state is executed. The operation prohibitor 56 is configured or programmed to execute the lock operation. As a result, even if the user issues an instruction to start printing, the printer 10 cannot advance to the printing operation or the cleaning operation, and is kept in a stop state. In this preferred embodiment, an error display operation is further executed, by which an error message that the printer 10 is inoperable until the waste liquid stored in the waste liquid tank 41 is discarded is displayed to the user. The notifier is configured or programmed to execute the error display operation. The notifier 55 displays a message that, for example, "The printer 10 cannot be activated until the waste liquid in the waste liquid tank 41 is discarded." on the display screen 10 (see FIG. 1).

In order to activate the printer 10 after the error message is displayed, the user needs to discard the waste liquid recovered to the waste liquid tank 41 or to replace the waste liquid tank 41 itself. In an example, the user removes the waste liquid tank 41 from the printer 10, discards the waste liquid recovered to the waste liquid tank 41 to the outside of the system, and then returns the waste liquid tank 41 to the printer 10. As a result, the weight of the waste liquid tank 41 is decreased, and the support table 43 is returned to the initial position P0. The first sensor 46 and the second sensor 47 are both returned to the OFF state. When the first sensor 46 and the second sensor 47 are both returned to the OFF state, the operation prohibitor 56 lifts the lock operation imposed on the printer 10.

As described above, the printer 10 in this preferred embodiment is configured such that the support table 43 supporting the waste liquid tank 41 is displaceable in accordance with the weight of the waste liquid tank 41. Therefore, the position of the support table 43 is changeable in accordance with the amount of the waste liquid in the waste liquid tank 41. With such an arrangement, the amount of the waste liquid in the waste liquid tank 41 is detectable based on the position of the support table 43. For detecting the amount of the waste liquid in the waste liquid tank 41, it is not necessary to perform any complicated computation based on the cleaning operation. Thus, according to this preferred embodiment, the amount of the waste liquid in the waste liquid tank 41 may be recognized accurately.

According to this preferred embodiment, the first sensor 46 and the second sensor 47 are provided. Therefore, the end state and also the near-end state of the waste liquid tank 41 are detectable. The near-end state and the end state of the waste liquid tank 41 are detectable step by step, and both of the near-end state and the end state may be recognized accurately. With the printer 10 in this preferred embodiment, the near-end state may be notified to the user as an advance warning, before the waste liquid tank 41 is put into the end state. With such an arrangement, for example, before the waste liquid tank 41 becomes full and the printing operation becomes inexecutable, the user may recognize the possibility that such a situation may occur. The user may discard the waste liquid at any timing after the alarm display is provided on the display screen 10*d* before the error display is provided on the display screen 10*d*. This may improve the convenience for the user.

In the printer 10 in this preferred embodiment, the support table 43 includes the carrying portion 43*aa*, on which the waste liquid tank 41 is to be placed, and the engagement portion 43*e*1 to be displaced downward as the weight of the waste liquid in the waste liquid tank 41 placed on the carrying portion 43*aa* is increased. The support table 43 is movably supported by the base member 42, and the loading spring 44 is present between the base member 42 and the support table 43. The loading spring 44 loads the support table 43 such that the engagement portion 43*e*1 is provided with an upward force.

The loading spring 44 includes the first end portion 44*a* attached to the base member 42 and the second end portion 44*b* located below the first end portion 44*a* and attached to the engagement portion 43*e*1. The loading spring 44 is configured to generate a tensile force to pull the second end portion 44*b* upward. The engagement portion 43*e*1 is configured to, when the waste liquid is recovered to the waste liquid tank 41, be displaced downward against the tensile force of the loading spring 44.

Therefore, according to this preferred embodiment, the structure in which the support table 43 is displaced in accordance with the weight of the waste liquid tank 41 and the displacement is detected easily and accurately may be realized at low cost and in a simple manner.

In this preferred embodiment, the base member 42 includes the first base member 42A and the second base member 42B, which is attached to the first base member 42A so as to be positionally adjustable in the up-down direction. The first end portion 44*a* of the loading spring 44 is attached to the second base member 42B. Therefore, the position in the up-down direction of the second base member 42B is adjustable to easily adjust the loading force of the loading spring 44. In the case where, for example, a low-cost loading spring is used as the loading spring 44, the loading force may vary individually. In this preferred embodiment, the loading force of the loading spring 44 is easily adjustable, and therefore, a low-cost loading spring is usable as the loading spring 44. The loading force of the loading spring 44 may be adjusted to appropriately set the weight of the waste liquid tank 41 when the support table 43 reaches the first position P1 and to appropriately set the weight of the waste liquid tank 41 when the support table 43 reaches the second position P2. According to this preferred embodiment, the weight of the waste liquid tank 41 detected as being in the near-end state and the weight of the waste liquid tank 41 detected as being in the end state are easily adjustable by merely adjusting the position in the up-down direction of the second base member 42B.

In this preferred embodiment, the support table 43 includes the fulcrum portion 43*p* supported by the base member 42, and is tiltable with the fulcrum portion 43*p* being the fulcrum. The fulcrum portion 43*p* may be directly supported by the base member 42 or indirectly supported by the base member 42 via another member. According to this preferred embodiment, the support table 43 is displaced little by little along the increase in the weight of the waste liquid tank 41. The support table 43 is not rapidly displaced. Therefore, the waste liquid may be prevented from splashing from the waste liquid tank 41 as, for example, a reaction to the displacement of the support table 43.

In this preferred embodiment, the carrying portion 43*aa* of the support table 43 is provided between the fulcrum portion 43*p* and the engagement portion 43*e*1. Distance G1 between the engagement portion 43*e*1, to which the loading spring 44 is attached, and the fulcrum portion 43*p* is longer than distance G2 between the central position 43*am* of the carrying portion 43*aa* and the fulcrum portion 43*p* (see FIG. 5). This allows the loading spring 44 to pull the support table 43 upward with a force smaller than the weight of the waste liquid tank 41. Therefore, the loading spring 44 may be decreased in the size and the cost. The amount of displacement in the up-down direction of the engagement portion 43*e*1 may be made larger than the amount of displacement in the up-down direction of the carrying portion 43*aa*. The engagement portion 43*e*1 is included in the light blocking plate 43*e*. According to this preferred embodiment, the amount of displacement of the light blocking plate 43*e* may be guaranteed to be large, and thus the waste liquid tank 41 may be determined as being in the near-end state or in the end state with high precision.

Figure 14A:
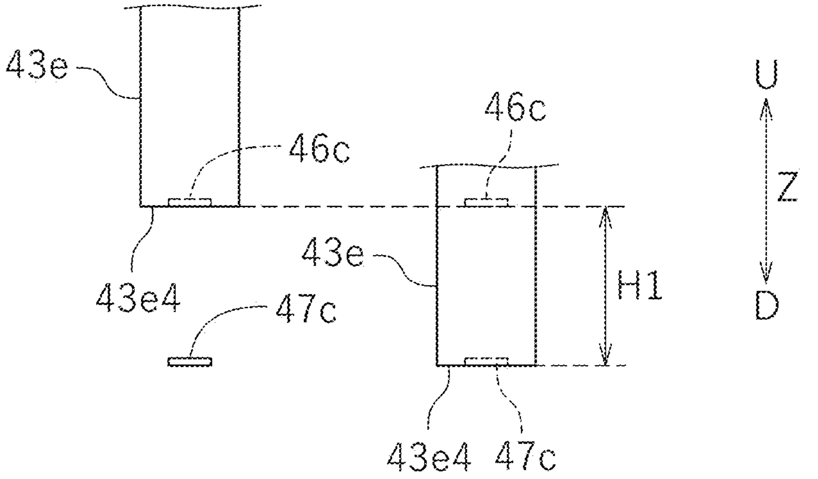
FIGS. 14A and 14B shows an operation in which a first sensor and a second sensor detect a light blocking plate.

In this preferred embodiment, the second sensor 47 is located below the first sensor 46. As shown in FIG. 14A, the light blocking plate 43*e* does not need to have the recessed portion 43*n* therein. The first sensor 46 may be configured to be put into the ON state from the OFF state when a bottom edge 43*e*4 of the light blocking plate 43*e* crosses the first optical axis 46*c*, and the second sensor 47 may be configured to be put into the ON state from the OFF state when the bottom edge 43*e*4 of the light blocking plate 43*e* crosses the second optical axis 47*c*. However, in this case, the light blocking plate 43*e* needs to move downward by height H1 after the first sensor 46 is put into the ON state before the second sensor 47 is put into the ON state. Therefore, the amount of movement of the light blocking plate 43*e* from the near-end state to the end state needs to be increased, which requires the support table 43 to be displaced significantly.

Figure 14B:
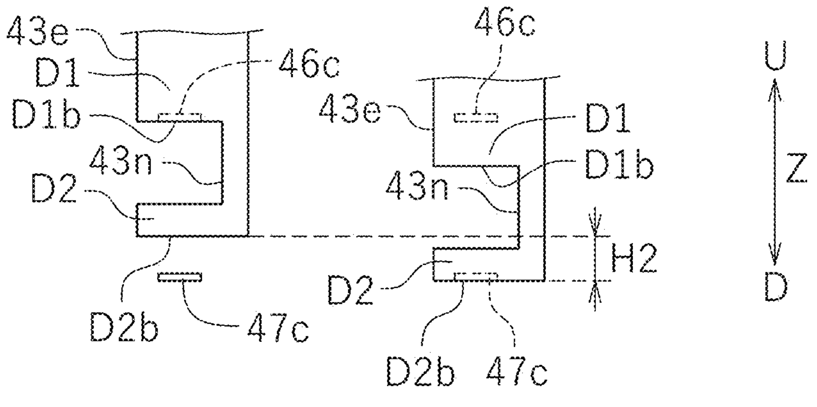

By contrast, in this preferred embodiment, as shown in FIG. 14B, the light blocking plate 43*e* has the recessed portion 43*n* therein. The first light blocking portion D1 is provided above the recessed portion 43*n*, and the second light blocking portion D2 is provided below the recessed portion 43*n*. The light blocking plate 43*e* includes the first light blocking portion D1 to be detected by the first sensor 46 when the support table 43 reaches the first position P1, and also includes the second light blocking portion D2, which is located below the first light blocking portion D1 and is to be detected by the second sensor 47 when the support table 43 reaches the second position P2. Therefore, the light blocking plate 43*e* merely needs to move by height H2 after the first sensor 46 is put into the ON state before the second sensor 47 is put into the ON state. H2<H1. According to this preferred embodiment, the amount of movement of the light blocking plate 43*e* from the near-end state to the end state is small. The amount of displacement of the support table 43 may be small. Therefore, the waste liquid mechanism 40 may be decreased in the size.

In this preferred embodiment, the first sensor 46 and the second sensor 47 each include a photosensor. Therefore, the displacement of the support table 43 may be detected quickly and accurately.

In this preferred embodiment, in the state where the support table 43 is at the initial position P0, distance L1 in the up-down direction between the bottom edge D1b of the first light blocking portion D1 and the first optical axis 46*c* is shorter than distance L2 in the up-down direction between the bottom edge D2b of the second light blocking portion D2 and the second optical axis 47*c* (see FIG. 9). With such an arrangement, while the light blocking plate 43*e* is moved downward, the first sensor 46 is first put into an ON state and then the second sensor 47 is put into an ON state. Therefore, as the waste liquid is accumulated in the waste liquid tank 41, the first sensor 46 and the second sensor 47 may be put into the ON state sequentially.

In this preferred embodiment, the engagement portion 43*e*1 to be displaced downward along with the increase in the weight of the waste liquid tank 41, the first light blocking portion D1 to be detected by the first sensor 46 and the second light blocking portion D2 to be detected by the second sensor 47 are defined by one light blocking plate 43*e*. Therefore, the above-described effects may be provided with a simple structure.

In this preferred embodiment, the operation prohibitor 56 is provided, which in the case where the second determinator 54 determines that the waste liquid tank 41 is in the end state, prohibits the printing operation of causing the ink to be injected from the nozzles 22*a* and the cleaning operation of causing the ink to be discharged from the nozzles 22*a*. With such an arrangement, the waste liquid tank 41 may be prevented from being overflown with the waste liquid, and thus the inside of the printer 10 and the area around the printer 10 may be prevented from being contaminated with the waste liquid.

Preferred Embodiment 2

Now, another preferred embodiment in which the structure of the waste liquid mechanism 40 is different will be described. A printer 10 according to preferred embodiment 2 and the printer according to preferred embodiment 1 are different in the structure of the waste liquid mechanism 40, but are the same in the other components. Thus, the components other than the waste liquid mechanism 40 will not be described below. Components and portions that have the same functions as those in preferred embodiment 1 will bear the same reference signs thereto, and detailed descriptions thereof will be omitted.

Figure 15:
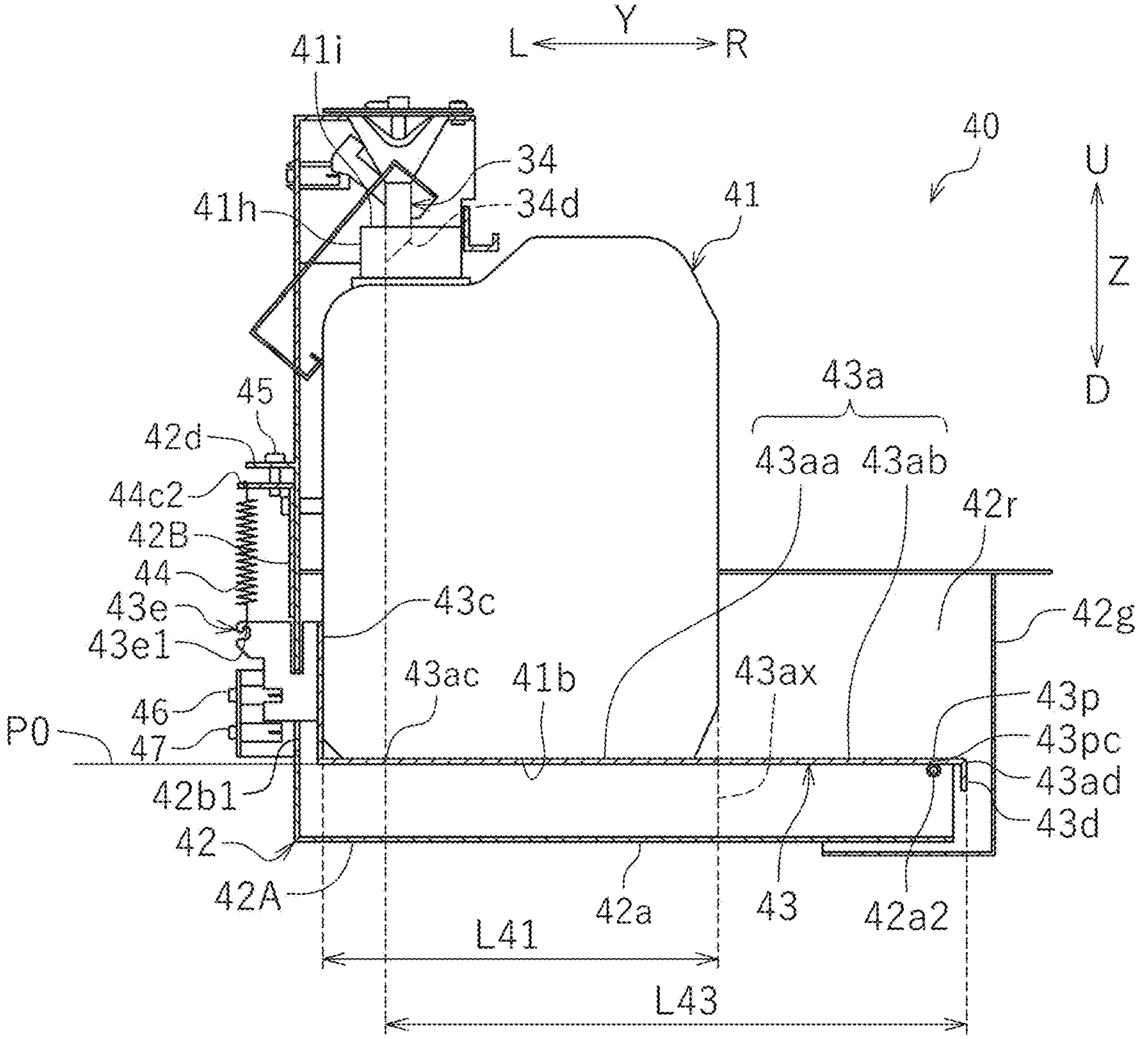
FIG. 15 is a front view of a waste liquid mechanism in preferred embodiment 2 of the present invention, showing a state where the support table is at the initial position.

As shown in FIG. 15, like in preferred embodiment 1, a waste liquid mechanism 40 in preferred embodiment 2 includes the waste liquid tank 41, the support table 43 supporting the waste liquid tank 41, the base member 42 movably supporting the support table 43, the loading spring 44, the first sensor 46, and the second sensor 47. The base member 42 includes the first base member 42A and the second base member 42B.

In this preferred embodiment, a right wall 42*g* extending upward vertically is provided to the right of the bottom wall 42*a* of the first base member 42A. A fulcrum shaft 42*a*2 extending forward is attached to the rear wall 42*r* of the first base member 42A. Although not shown, a fulcrum shaft 42*a*2 extending rearward is attached to the front wall of the first base member 42A. The lateral plate portion 43*a* of the support table 43 is tiltably supported by these fulcrum shafts 42*a*2. The support table 43 is tiltably supported by the base member 42 indirectly via the fulcrum shafts 42*a*2. In this preferred embodiment, the fulcrum shafts 42*a*2 are each defined by a screw. It should be noted that each of the fulcrum shafts 42*a*2 may be any shaft that is capable of tiltably supporting the lateral plate portion 43*a*, and is not limited to having any specific structure. The fulcrum shafts 42*a*2 may be solid or hollow. In this preferred embodiment, the support table 43 is tilted with the fulcrum shafts 42*a*2 being the fulcrum. The portions, of the support table 43, that are in contact with the fulcrum shafts 42*a*2 act as the fulcrum portion 43*p* of the support table 43.

In this preferred embodiment, the lateral plate portion 43*a* of the support table 43 includes an extending portion 43*ab* in addition to the carrying portion 43*aa*. The carrying portion 43*aa* is a portion on which the waste liquid tank 41 to be is placed (in other words, a portion to overlap the waste liquid tank 41 as seen from above) in the state where the support table 43 is at the initial position. In FIG. 15, straight line 43*ax* represents a border between the carrying portion 43*aa* and the extending portion 43*ab*. The extending portion 43*ab* extends rightward from the carrying portion 43*aa*. The carrying portion 43*aa* and the extending portion 43*ab* of the support table 43 have a size with which the waste liquid tank 41 may be placed thereon without interfering with the bottom end portion 34*d* of the waste liquid passage 34. In this preferred embodiment, as shown in FIG. 15, as seen along the tilting center line 43*pc* of the support table 43 in the state where the support table 43 is at the initial position P0, a distance L43 between a position 43*ac*, of the carrying portion 43*aa*, just below the bottom end portion 34*d* of the waste liquid passage 34 and an end 43*ad* of the extending portion 43*ab* is longer than a length L41 of a bottom surface 41*b* of the waste liquid tank 41. In this preferred embodiment, the support table 43 is relatively long in the left-right direction. The length in the left-right direction of the lateral plate portion 43*a* is longer than the length in the left-right direction of the waste liquid tank 41, and is, for example, at least about 1.5 times of the length in the left-right direction of the waste liquid tank 41. In this preferred embodiment, the waste liquid tank 41 is slidable in the left-right direction on the support table 43.

Figure 16:
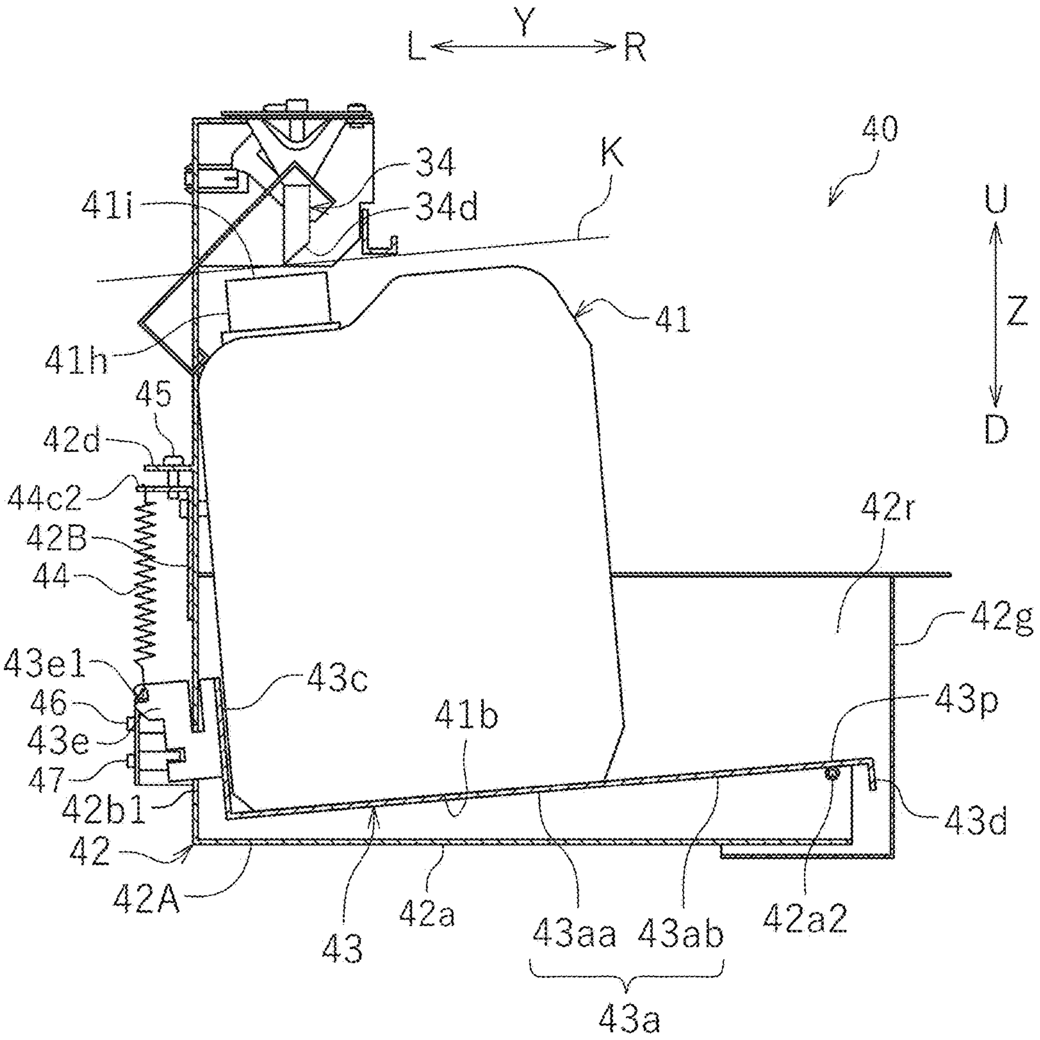
FIG. 16 is a front view of the waste liquid mechanism in preferred embodiment 2 of the present invention, showing a state where the support table is tilted to the maximum possible degree.

As shown in FIG. 15, in the state where the support table 43 is at the initial position P0, the bottom end portion 34*d* of the waste liquid passage 34 is inserted into the neck portion 41*h* of the waste liquid tank 41. In the state where the support table 43 is at the initial position P0, the opening 41*i* of the waste liquid tank 41 is located above the bottom end portion 34*d* of the waste liquid passage 34. By contrast, as shown in FIG. 16, in a state where the support table 43 is tilted to the maximum possible degree, the bottom end portion 34*d* of the waste liquid passage 34 is disengaged from the neck portion 41*h* of the waste liquid tank 41. In this preferred embodiment, the support table 43 is configured such that in the state where the support table 43 is tilted to the maximum possible degree, the waste liquid tank 41 is slidable from the extending portion 43*ab* side to the carrying portion 43*aa* side (namely, from the right to the left) without interfering with the bottom end portion 34*d* of the waste liquid passage 34. In order to avoid the interference, in the state where the support table 43 is tilted to the maximum possible degree, at least a portion, of the waste liquid tank 41, that is to the left of the bottom end portion 34*d* of the waste liquid passage 34 is located below straight line K, which passes the bottom end portion 34*d* of the waste liquid passage 34 (more strictly, a bottom end of the bottom end portion 34*d*) and is parallel to the carrying portion 43*aa* of the support table 43.

Figure 17:
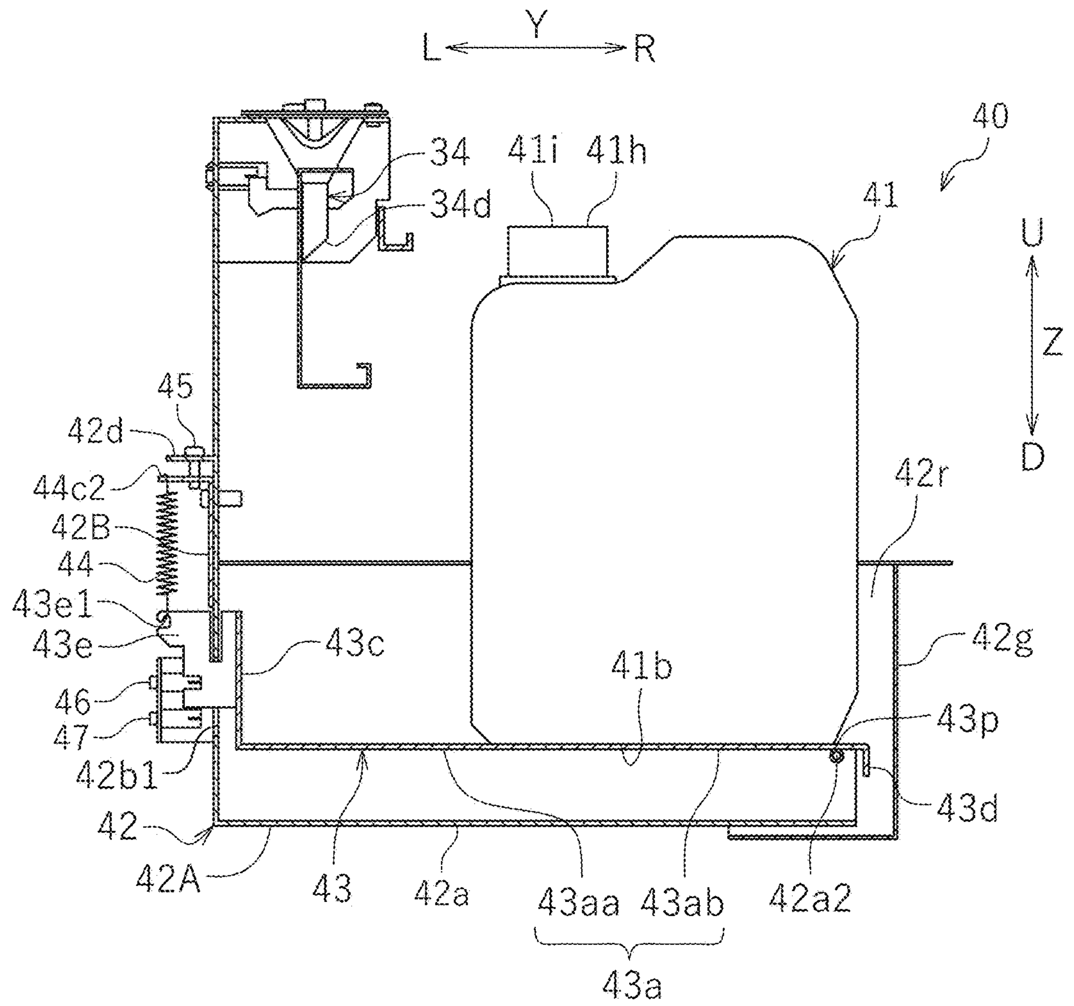
FIG. 17 is a front view of the waste liquid mechanism in preferred embodiment 2 of the present invention, showing a state where a waste liquid tank is placed on a right portion of the support table.
Figure 18:
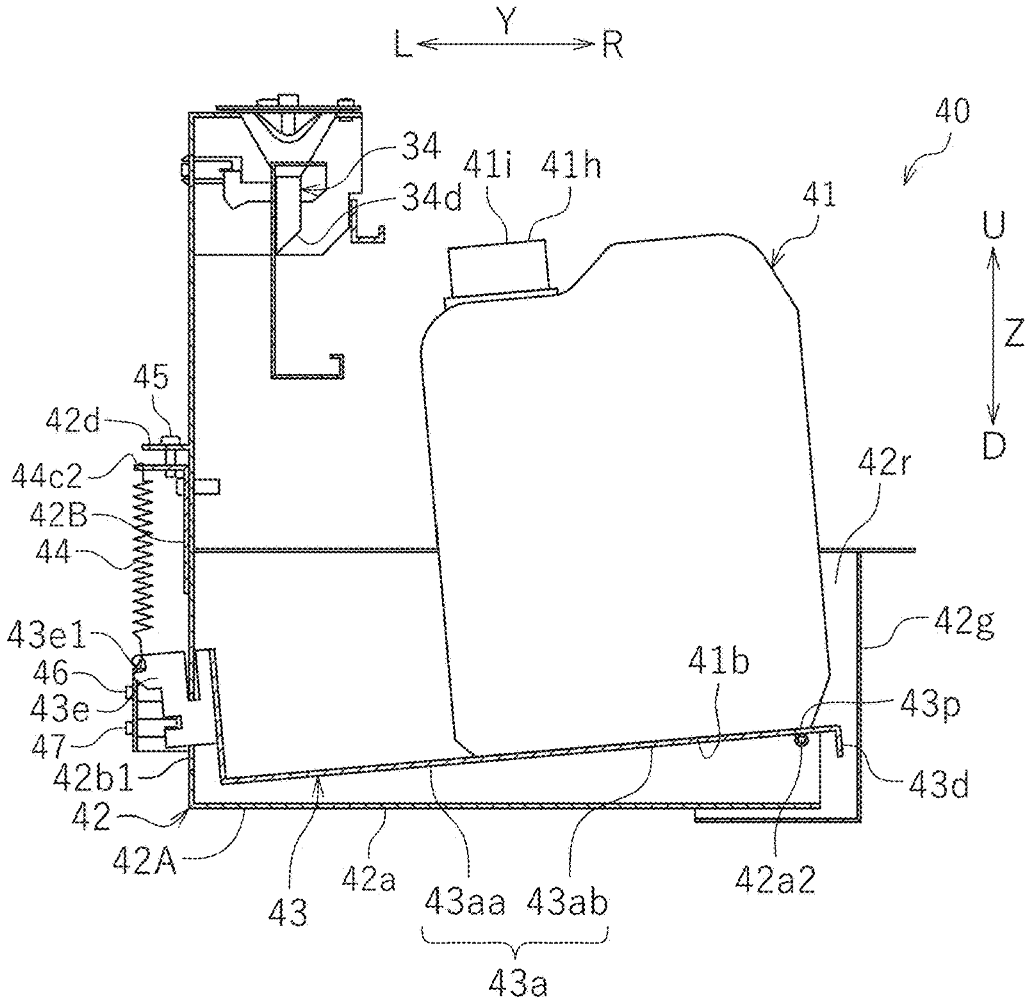
FIG. 18 is a front view of the waste liquid mechanism in preferred embodiment 2 of the present invention, showing a state where the waste liquid tank is placed on the right portion of the support table and the support table is tilted to the maximum possible degree.

According to this preferred embodiment, the waste liquid tank 41 may be installed as follows. First, as shown in FIG. 17, the waste liquid tank 41 is placed on the lateral plate portion 43*a* of the support table 43 from above at a position off from a position just below the waste liquid passage 34. Namely, the waste liquid tank 41 is placed on a right portion of the lateral plate portion 43*a* from above. At this point, at least a portion of the waste liquid tank 41 is located on the extending portion 43*ab*. [011U] Next, as shown in FIG. 18, the waste liquid tank 41 is pressed downward to tilt the support table 43.

Next, as shown in FIG. 16, the waste liquid tank 41 is slid leftward on the support table 43 while the waste liquid tank is pressed downward (namely, while the support table 43 is tilted). At this point, the neck portion 41*h* of the waste liquid tank 41 is located below the straight line K. Therefore, the waste liquid tank 41 does not collide against the waste liquid passage 34. The waste liquid tank 41 may be moved to a position just below the waste liquid passage 34 without being disturbed by the waste liquid passage 34.

In a final step, the force of pressing the waste liquid tank 41 is weakened or nullified. For example, the hand is taken off from the waste liquid tank 41. This causes the support table 43 to be pulled upward by the loading spring 44. As a result, as shown in FIG. 15, the bottom end portion 34*d* of the waste liquid passage 34 is inserted into the neck portion 41*h* of the waste liquid tank 41. In this manner, the waste liquid tank 41 is installed.

The waste liquid tank 41 is removed by a procedure opposite to the procedure described above. Namely, the waste liquid tank 41 is moved in the order shown in FIG. 15, FIG. 16, FIG. 18 and FIG. 17. In this manner, the waste liquid tank 41 may be moved to a position off from the position just below the waste liquid passage 34 by merely sliding the waste liquid tank 41 on the lateral plate portion 43*a* of the support table 43. Therefore, the waste liquid tank 41 does not need to be pivoted in order to avoid the interference of the neck portion 41*h* of the waste liquid tank 41 with the bottom end portion 34*d* of the waste liquid passage 34.

According to this preferred embodiment, in order to be installed or removed, the waste liquid tank 41 does not need to be pivoted so as to avoid the bottom end portion 34*d* of the waste liquid passage 34. The waste liquid tank 41 may be merely slid on the lateral plate portion 43*a* of the support table 43 to move the waste liquid tank 41 to the position just below the waste liquid passage 34, or to a position off from the position just below the waste liquid passage 34. This allows the waste liquid tank 41 to be installed or removed easily. Especially, in order to be removed, the waste liquid tank 41 having a large amount of waste liquid stored therein does not need to be pivoted. This prevents the waste liquid from being spilt from the waste liquid tank 41, and improves the ease of work in handling the waste liquid tank 41. According to this preferred embodiment, the tiltable support table 43 and the loading spring 44 are effectively usable as a measure to allow the waste liquid tank 41 to be installed or removed easily.

According to this preferred embodiment, in order to be installed or removed, the waste liquid tank 41 does not need to be pivoted so as to avoid the bottom end portion 34*d* of the waste liquid passage 34. The waste liquid tank 41 may be merely slid on the lateral plate portion 43*a* of the support table 43 to move the waste liquid tank 41 to the position just below the waste liquid passage 34, or to a position off from the position just below the waste liquid passage 34. This allows the waste liquid tank 41 to be installed or removed easily. According to this preferred embodiment, the tiltable support table 43 and the loading spring 44 are effectively usable as a measure to allow the waste liquid tank 41 to be installed or removed easily.

The printers 10 according to the preferred embodiments have been described above. The inkjet printers according to preferred embodiment of the present invention is not limited to any of these printers. The present invention may be carried out based on the contents disclosed herein and the technological common knowledge in the art. The technology defined in the claims encompasses various modifications and alterations of the above-described preferred embodiments. For example, portions of the above-described preferred embodiments may be combined together, or a portion of any one of above-described preferred embodiments may be replaced with another preferred embodiment. Another preferred embodiment may be added to any one of the above-described preferred embodiments. A technological feature may be appropriately deleted unless such a technological feature is described as being indispensable.

For example, in the above-described preferred embodiments, the first sensor 46 and the second sensor 47 are each a normally-off-type photosensor, and are respectively configured to be changed from the OFF state to the ON state when detecting the first light blocking portion D1 and the second light blocking portion D2. The first sensor 46 and the second sensor 47 are not limited to such a sensor. The first sensor 46 and the second sensor 47 may be normally-on-type photosensors, and may respectively be configured to be changed from the ON state to the OFF state when detecting the first light blocking portion D1 and the second light blocking portion D2.

In the above-described preferred embodiments, the first sensor 46 and the second sensor 47 preferably each include a photosensor, but are not limited to such a sensor. The first sensor 46 and/or the second sensor 47 may be, for example, a non-contact sensor or a contact sensor. The first sensor 46 and/or the second sensor 47 may be, for example, an angular sensor directly detecting a tilting angle of the support table 43, a position sensor detecting the position of the support table 43, a switch detecting the tilt of the support table 43, or the like. In the above-described preferred embodiments, the number of the sensors is two. Alternatively, the number of the sensors may be three, or four or greater.

In the above-described preferred embodiments, the second sensor 47 is located below the first sensor 46, and the second light blocking portion D2 is located below the first light blocking portion D1. The sensors 46 and 47 and the light blocking portions D1 and D2 are not limited to this. The second sensor 47 may be located above the first sensor 46, and the second light blocking portion D2 may be located above the first light blocking portion D1. Even in such preferred embodiment, distance L1 in the up-down direction between the bottom edge D1b of the first light blocking portion D1 and the first optical axis 46*c* of the first sensor 46 may be set shorter than distance L2 in the up-down direction between the bottom edge D2b of the second light blocking portion D2 and the second optical axis 47*c* in the state where the support table 43 is at the initial position P0. In this manner, the near-end state and the end state may be detected step by step.

In the above-described preferred embodiments, the loading spring 44 is a tension spring pulling the support table 43 upward. Alternatively, the loading spring 44 may be a compression spring pressing the support table 43 upward.

In the above-described preferred embodiments, the arm portion 42*c*2 of the second base member 42B is located below the arm portion 42*d* of the first base member 42A. The arm portions 42*c*2 and 42*d* are not limited to this. The arm portion 42*c*2 of the second base member 42B may be located above the arm portion 42*d* of the first base member 42A.

In the above-described preferred embodiments, the printer 10 is configured such that the carriage 19 moves in the left-right direction Y and the table 25 moves in the front-rear direction X. The printer 10 is not limited to this. The carriage 19 and the table 25 move relative to each other, and either one of the carriage 19 and the table 25 may move in the left-right direction Y or in the front-rear direction X. Alternatively, for example, the table 25 may be unmovable, and the carriage 19 may move both in the left-right direction Y and in the front-rear direction X.

In the above-described preferred embodiments, the printer 10 is of a so-called shuttle type (serial type), in which the ink heads 22 are mounted on the carriage 19 and move back and forth in the left-right direction Y (shuttle movement) to perform printing. The printer 10 is not limited to this. The technology disclosed herein is also applicable to, for example, a so-called line-type printer, which includes a line head that is wider than, or as wide as, the printing target 25*a*, and performs printing with the line head being secured.

In the above-described preferred embodiments, the printer 10 includes the ultraviolet lamps 23. The ultraviolet lamps 23 are not indispensable and may be omitted. In the case where the ultraviolet lamps 23 are omitted, ink other than the UV ink may be stored in the ink cartridges 21.

Figure 19:
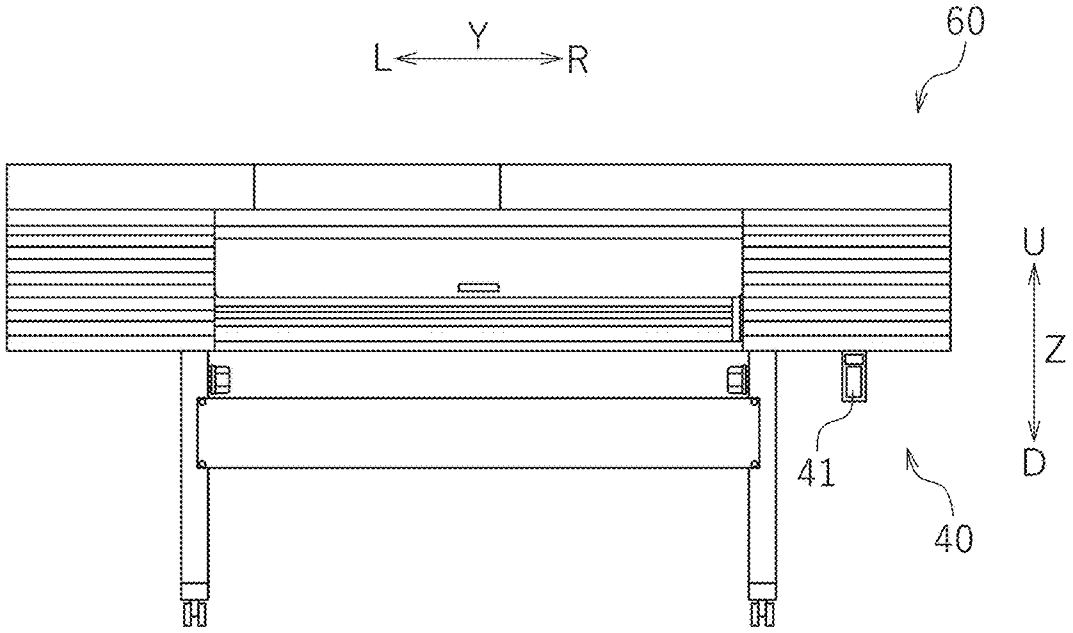
FIG. 19 is a front view of an inkjet printer according to another preferred embodiment of the present invention.

In the above-described preferred embodiments, the printer 10 is of a flat-bed type, and the waste liquid mechanism 40 and the waste liquid tank 41 are located inside the printer 10. The printer 10 is not limited to this. FIG. 19 shows a printer 60 of a so-called roll-to-roll type. The printer 60 transports a roll-type medium as the printing target. In the case of the printer 60, the waste liquid mechanism 40 and the waste liquid tank 41 are located outside the printer 60.

The printer 10 is not limited to a printer used independently, and may be combined with another device. For example, the printer 10 may include a cutting head that cuts the printing target 25*a*.

In the above-described preferred embodiments, inkjet printers are described as examples. The waste liquid mechanism 40 is also applicable to a wide variety of devices using an inkjet method other than the inkjet printer, for example, various production devices, production devices of electronic devices, three-dimensional printing devices (so-called 3D printers), measuring devices, pharmaceutical drug absorbing devices, and the like.

In the above-described preferred embodiments, the liquid to be recovered to the waste liquid tank 41 is, for example, a waste liquid containing waste ink discharged from the ink heads 22. The liquid to be recovered to the waste liquid tank 41 is not limited to this. The liquid to be recovered to the waste liquid tank 41 may be a liquid other than ink, for example, a washing liquid for washing the nozzles 22*a* of the ink heads 22 or the like, a functional organic solution, a pharmaceutical drug, a resin solution, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer, comprising:

a head including a nozzle from which a liquid is injected; a cleaner to perform a cleaning operation of to cause the liquid to be discharged from the nozzle;

a waste liquid tank to which the liquid discharged by the cleaning operation is recovered from the cleaner;

a support table supporting the waste liquid tank, the support table being displaceable in accordance with a weight of the liquid in the waste liquid tank, such that the support table is at an initial position in a state where the liquid is not recovered to the waste liquid tank, is displaced to a first position when a weight of the waste liquid tank and the liquid in the waste liquid tank reaches a first threshold value, and is displaced to a second position when the weight of the waste liquid tank and the liquid in the waste liquid tank reaches a second threshold value larger than the first threshold value;

a first sensor to detect that the support table has reached the first position;

a second sensor to detect that the support table has reached the second position;

a first determinator to determine that the waste liquid tank is in a near-end state when the support table is detected by the first sensor to have reached the first position;

a second determinator to determine that the waste liquid tank is in an end state when the support table is detected by the second sensor to have reached the second position; and a notifier to notify a user of the near-end state when the first determinator determines that the waste liquid tank is in the near-end state.

2. The inkjet printer according to claim 1, wherein the support table includes a carrying portion on which the waste liquid tank is to be placed, and an engagement portion displaced downward along an increase in the weight of the liquid in the waste liquid tank placed on the carrying portion, and the inkjet printer further includes:

a base movably supporting the support table; and a loader between the base and the support table to load the support table such that the engagement portion is provided with an upward force.

3. The inkjet printer according to claim 2, wherein the loader includes a first end portion attached to the base and a second end portion located below the first end portion and attached to the engagement portion of the support table, and is configured to generate a force pulling the second end portion upward; and the inkjet printer is configured such that when the liquid is recovered to the waste liquid tank, the engagement portion of the support table is displaced downward against a tensile force of the loader.

4. The inkjet printer according to claim 3, wherein the base includes a first base, and a second base attached to the first base so as to be positionally adjustable in an up-down direction; and the first end portion of the loader is attached to the second base.

5. The inkjet printer according to claim 2, wherein the support table includes a fulcrum portion supported by the base and is tiltable with the fulcrum portion being a fulcrum.

6. The inkjet printer according to claim 5, wherein as seen along a tilting center line of the support table, the carrying portion is provided between the fulcrum portion and the engagement portion.

7. The inkjet printer according to claim 6, further comprising a liquid passage including a bottom end portion opened downward, the liquid passage guiding the liquid discharged from the cleaner; wherein the waste liquid tank includes an opening opened upward;

the support table includes an extending portion extending from the carrying portion and allowing the waste liquid tank to be placed thereon;

as seen along the tilting center line of the support table, a distance between a position, of the carrying portion, just below the bottom end portion of the liquid passage in a state where the support table is at the initial position and an end of the extending portion is longer than a length of a bottom surface of the waste liquid tank;

in a state where the waste liquid tank is placed on the carrying portion and the support table is at the initial position, the opening of the waste liquid tank is located above the bottom end portion of the liquid passage; and as seen along the tilting center line in a state where the waste liquid tank is placed on the carrying portion and the support table is tilted to a maximum possible degree, at least a portion, of the waste liquid tank, that is closer to the engagement portion than the bottom end portion of the liquid passage is located below a straight line passing the bottom end portion of the liquid passage and parallel to the carrying portion.

8. The inkjet printer according to claim 2, wherein the second sensor is located below the first sensor; and the support table includes a first detection target to be detected by the first sensor when the support table reaches the first position and also includes a second detection target located below the first detection target, the second detection target being to be detected by the second sensor when the support table reaches the second position.

9. The inkjet printer according to claim 8, wherein the first sensor includes a photosensor radiating light along a first optical axis;

the second sensor includes a photosensor radiating light along a second optical axis;

the first detection target includes a first plate portion crossing the first optical axis when the support table reaches the first position; and the second detection target includes a second plate portion crossing the second optical axis when the support table reaches the second position.

10. The inkjet printer according to claim 9, wherein in a state where the support table is at the initial position, a distance in an up-down direction between a bottom edge of the first plate portion and the first optical axis is shorter than a distance in the up-down direction between a bottom edge of the second plate portion and the second optical axis.

11. The inkjet printer according to claim 9, wherein the engagement portion, the first plate portion and the second plate portion are included in a plate.

12. The inkjet printer according to claim 1, further comprising an operation prohibitor to prohibit the cleaning operation when the second determinator determines that the waste liquid tank is in the end state.

* * * * *